(12) United States Patent
Ogawa et al.

(10) Patent No.: US 8,654,692 B2
(45) Date of Patent: Feb. 18, 2014

(54) WIRELESS COMMUNICATION APPARATUS AND WIRELESS COMMUNICATION METHOD

(75) Inventors: Yoshihiko Ogawa, Kanagawa (JP); Akihiko Nishio, Kanagawa (JP); Daichi Imamura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 280 days.

(21) Appl. No.: 13/126,366

(22) PCT Filed: Oct. 29, 2009

(86) PCT No.: PCT/JP2009/005751
§ 371 (c)(1),
(2), (4) Date: Apr. 27, 2011

(87) PCT Pub. No.: WO2010/050221
PCT Pub. Date: May 6, 2010

(65) Prior Publication Data
US 2011/0205973 A1 Aug. 25, 2011

(30) Foreign Application Priority Data

Oct. 30, 2008 (JP) ................................. 2008-280340
Aug. 7, 2009 (JP) ................................. 2009-184702

(51) Int. Cl.
*H04B 7/00* (2006.01)

(52) U.S. Cl.
USPC ........................................................ 370/310

(58) Field of Classification Search
USPC .................. 370/310–350, 208; 455/59, 150.1
See application file for complete search history.

(56) References Cited

U.S. PATENT DOCUMENTS

| | | | | |
|---|---|---|---|---|
| 2002/0163879 | A1* | 11/2002 | Li et al. | 370/200 |
| 2007/0253320 | A1* | 11/2007 | Yu et al. | 370/208 |
| 2009/0225666 | A1* | 9/2009 | Ofuji et al. | 370/248 |
| 2010/0067472 | A1* | 3/2010 | Ball et al. | 370/329 |
| 2010/0098012 | A1* | 4/2010 | Bala et al. | 370/329 |
| 2011/0085516 | A1* | 4/2011 | Pajukoski et al. | 370/330 |

FOREIGN PATENT DOCUMENTS

| | | |
|---|---|---|
| JP | 2004-529527 | 9/2004 |
| JP | 2007-36627 | 2/2007 |

OTHER PUBLICATIONS

International Search Report dated Nov. 26, 2009.
3GPP TS 36.212 V8.3.0, "3rd Generation Partnership Project; Technical Specification Group Radio Access Network; Evolved Universal Terrestrial Radio Access (E-UTRA); Multiplexing and channel coding (Release 8)," May, 2008, pp. 1-48.
3GPP TSG RAN WG1 #56, "Concurrent PUSCH and PUCCH Transmissions," Samsung, R1-090611, Feb. 9-13, 2009, pp. 1-2.
3GPP TSG-RAN WG1 #53bis, "Carrier aggregation in LTE-Advanced," Ericsson, R1-082468, Jun. 30-Jul. 4, 2008, pp. 1-6.

* cited by examiner

*Primary Examiner* — Andrew Chriss
*Assistant Examiner* — Kenan Cehic
(74) *Attorney, Agent, or Firm* — Dickinson Wright PLLC

(57) ABSTRACT

Disclosed is a wireless communication apparatus that can improve the efficiency of using data resources, while suppressing the increase in CM of transport signals in a wireless communication system in which single-carrier transmissions and multi-cluster transmissions are coexistent. In this apparatus, a multiplex manner deciding unit (207) divides a control information signal into a first control information signal and a second control information signal, selects a time multiplex as the manner of multiplexing a data signal and the first control information signal, selects a frequency multiplex as the manner of multiplexing the data signal and the second control information signal, and increases the ratio of the second control information signal to the first control information signal as the number of clusters is increased.

10 Claims, 28 Drawing Sheets

F.G.8

| SEMISTATIC REPORT | DATA SIGNAL TRANSMISSION METHOD | |
| --- | --- | --- |
| | CONTINUOUS BAND ALLOCATION | DISCONTINUOUS BAND ALLOCATION |
| TDM REPORT | TDM | FDM |
| FDM REPORT | FDM | |

FIG.26

WIRELESS COMMUNICATION APPARATUS AND WIRELESS COMMUNICATION METHOD

TECHNICAL FIELD

The present invention relates to a radio communication apparatus and a radio communication method applicable to a radio communication system in which single-carrier transmission and multicluster transmission are both used.

BACKGROUND ART

3GPP LTE (3rd Generation Partnership Project Long Term Evolution: hereinafter abbreviated as "LTE") adopts single-carrier transmission whereby data signals are allocated to a continuous band on an uplink. FIG. 1A shows how frequency resources are allocated in single-carrier transmission. Single-carrier transmission has a characteristic that its CM (Cubic Metric) is small. Therefore, single-carrier transmission makes it possible to reduce the backoff of a power amplifier for transmitting a transmission signal without distortion, increase maximum transmittable power, and thereby expand the cell coverage.

Furthermore, 3GPP LTE-Advanced (3rd Generation Partnership Project Long Term Evolution-Advanced: hereinafter abbreviated as "LTE-Advanced") which is an improvement on LTE is studying the adoption of multicluster transmission on an uplink. FIG. 1B illustrates how frequency resources are allocated in multicluster transmission. As shown in FIG. 1B, data signals are allocated to a plurality of discontinuous clusters in multicluster transmission. Here, the "cluster" refers to a plurality of carrier groups in frequency resource allocation. FIG. 1B shows an example of multicluster transmission where the number of clusters is 2.

As shown in FIG. 1B, since data signals are allocated to discontinuous carrier groups in multicluster transmission, multicluster transmission can improve a frequency diversity gain compared to single-carrier transmission. On the other hand, CM increases in multicluster transmission compared to single-carrier transmission.

In LTE-Advanced, studies are underway about a transmission method to switch between single-carrier transmission and multicarrier transmission on an uplink.

In LTE and LTE-Advanced, there are cases where data signals and control it formation signals are simultaneously transmitted on an uplink. In this case, the data signals and the control information signals need to be multiplexed and transmitted. There are two methods of multiplexing data signals and the control information signals; time multiplexing (TDM: Time Division Multiplexing) and frequency multiplexing (FDM: Frequency Division Multiplexing).

Hereinafter, a case will be described where time division multiplexing and frequency division multiplexing are used as the methods of multiplexing data signals and control information signals on an LTE uplink. Examples of a control information signal to be multiplexed with a data signal include a response signal such as ACK/NACK for the data signal transmitted on a downlink, but the control information signal is not limited to this.

[1] Time Division Multiplexing (See FIG. 2)

In time division multiplexing, a control information signal is transmitted using the same frequency resource as that of a data signal. Applying time division multiplexing to an LTE uplink results in single-carrier transmission, and therefore can maintain low CM. However, on the LTE uplink, a frequency resource for allocating a control information signal (hereinafter referred to as "control information resource") is provided on a frequency different from a frequency resource for allocating a data signal (hereinafter referred to as "data resource"). To be more specific, on the LTE uplink, control information resources are provided on PUCCHs (Physical Uplink Control CHannel) located at both ends of a system band. Therefore, when a control information signals are allocated to data resources through time division multiplexing, the efficiency of use of data resources deteriorates.

[2] Frequency Division Multiplexing (See FIG. 3)

In frequency division multiplexing, a control information signal is transmitted allocated to a control information resource which is different from a data resource. Therefore, frequency division multiplexing can avoid the efficiency of use of data resources from deteriorating. However, when frequency division multiplexing is applied to an LTE uplink, data signals and control information signals are transmitted using multicluster transmission, which causes CM to increase compared to single-carrier transmission.

Thus, time division multiplexing which enables low CM single-carrier transmission is adopted for an LTE uplink (see non-patent literature 1)

CITATION LIST

Non-Patent Literature

NPL 1
5.2.2.6 TS36.212 v8.3.0 "3GPP TSG RAN; Evolved Universal Terrestrial Radio Access (E-UTRA); Multiplexing and channel coding"

NPL 2
3GPP TSG RAN WG1 #56, R1-090611, "Concurrent PUSCH and PUCCH Transmissions," Athens, Greece, Feb. 9-13, 2009.

SUMMARY OF INVENTION

Technical Problem

However, in multicluster transmission, even when data signals and control information signals are time division multiplexed as in the case of single-carrier transmission, it may not always be possible to maintain low CM due to differences in the above described transmission method.

It is therefore an object of the present invention to provide a radio communication apparatus and a radio communication method in a radio communication system in which single-carrier transmission and multicluster transmission are both used, capable of improving the efficiency of use of data resources while preventing CM of transmission signals from increasing.

Solution to Problem

The radio communication apparatus of the present invention is a radio communication apparatus for use on a transmitting side, adopted in a radio communication system in which single-carrier transmission and multicluster transmission are both used, and adopts a configuration including a determining section that determines a method of multiplexing a data signal and a control information signal based on the number of carrier groups used to transmit the data signal, a multiplexing section that multiplexes the data signal and the control information signal to generate a multiplexed signal based on the multiplexing method and a transmission section that transmits the multiplexed signal to a radio communication apparatus used on a receiving side.

The radio communication apparatus of the present invention is a radio communication apparatus, for use on a receiving side, adopted in a radio communication system in which single-carrier transmission and multicluster transmission are both used, and adopts a configuration including a deciding section that decides a method of multiplexing a data signal and a control information signal based on the number of carrier groups used to transmit the data signal, and a reporting section that reports information about the number of carrier groups to a radio communication apparatus on a transmitting side.

The radio communication method of the present invention is a radio communication method to be adopted in a radio communication system in which single-carrier transmission and multicluster transmission are both used, determining a method of multiplexing a data signal and a control information signal based on the number of carrier groups used to transmit the data signal, generating a multiplexed signal by multiplexing the data signal and the control information signal based on the multiplexing method and transmitting the multiplexed signal to a radio communication apparatus used on a receiving side.

Advantageous Effects of Invention

According to the present invention, it is possible to improve the efficiency of use of data resources while preventing CM of a transmission signal from increasing in a radio communication system in which single-carrier transmission and multicluster transmission are both used.

BRIEF DESCRIPTION OF DRAWINGS

FIG. 26 is a diagram illustrating an example of resource allocation according to Embodiment 5 of the present invention;

DESCRIPTION OF EMBODIMENTS

Hereinafter, embodiments of the present invention will be described in detail with reference to the accompanying drawings.

Embodiment 1

Figure 1A:
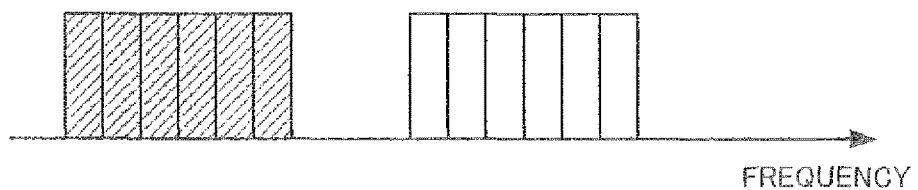
FIG. 1A is a diagram illustrating allocation of frequency resources of single-carrier transmission.
Figure 1B:
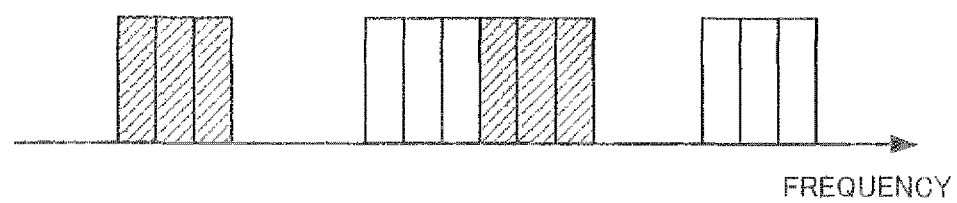
FIG. 1B is a diagram illustrating allocation of frequency resources of multicluster transmission.
Figure 2:
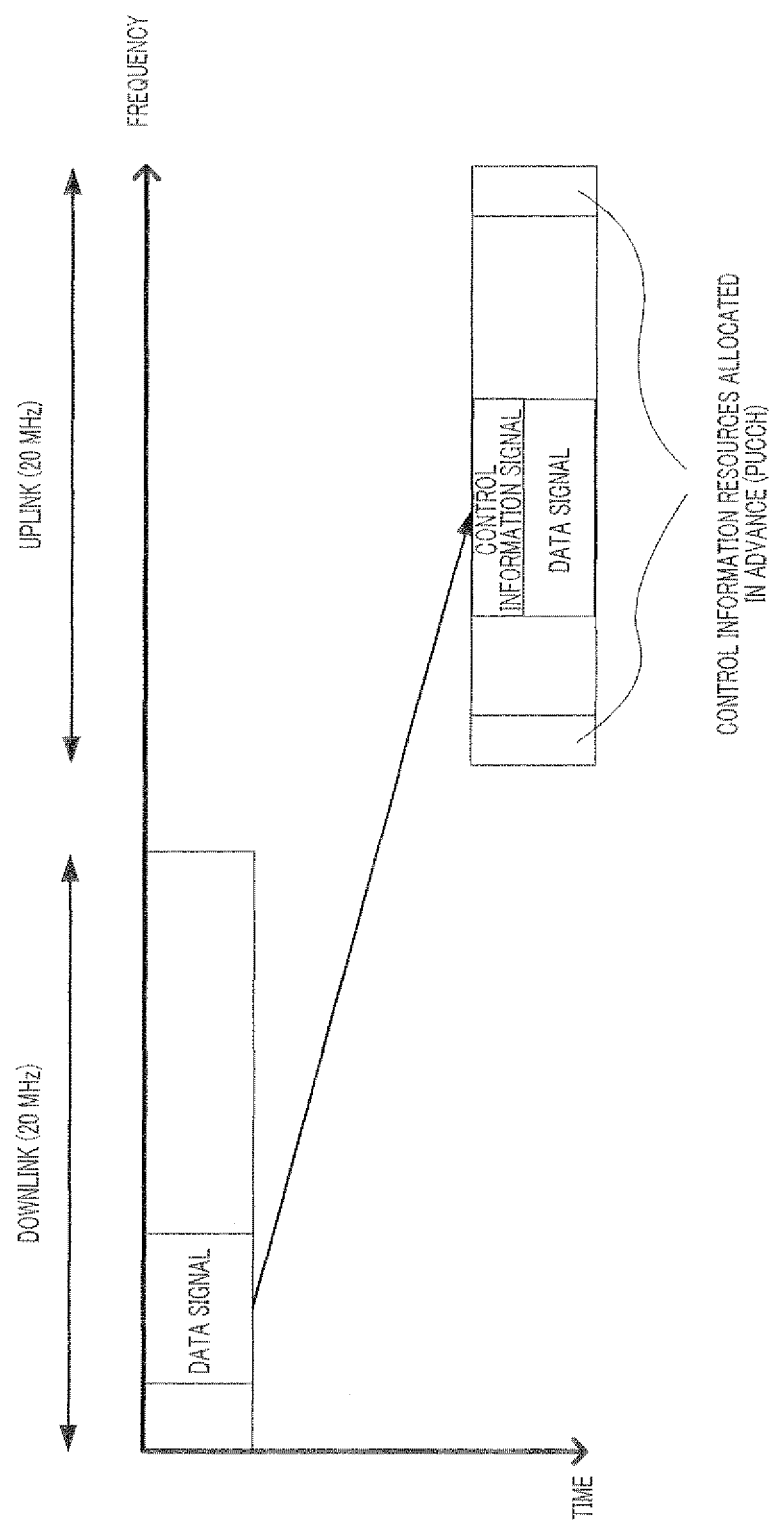
FIG. 2 is a diagram illustrating time division multiplexing.
Figure 3:
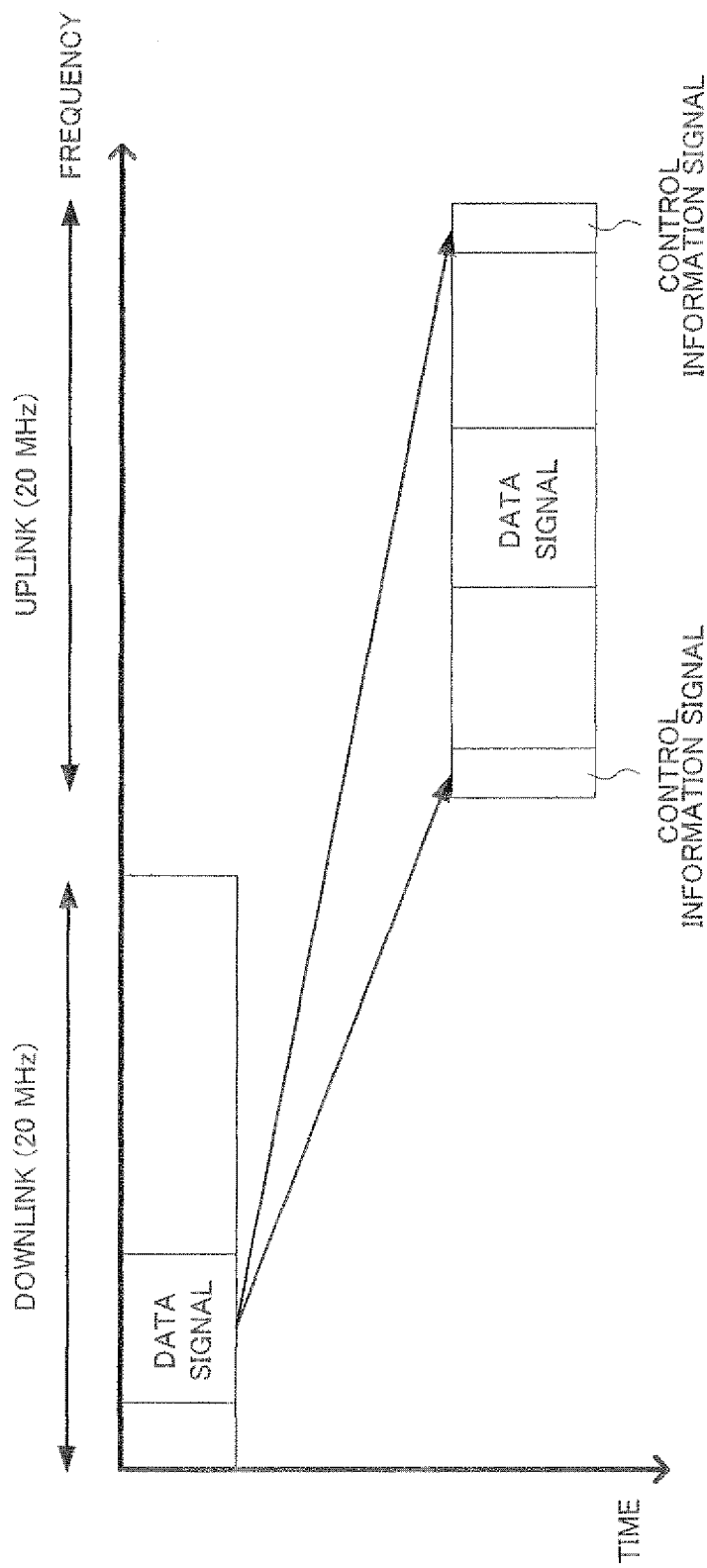
FIG. 3 is a diagram illustrating frequency division multiplexing.
Figure 4:
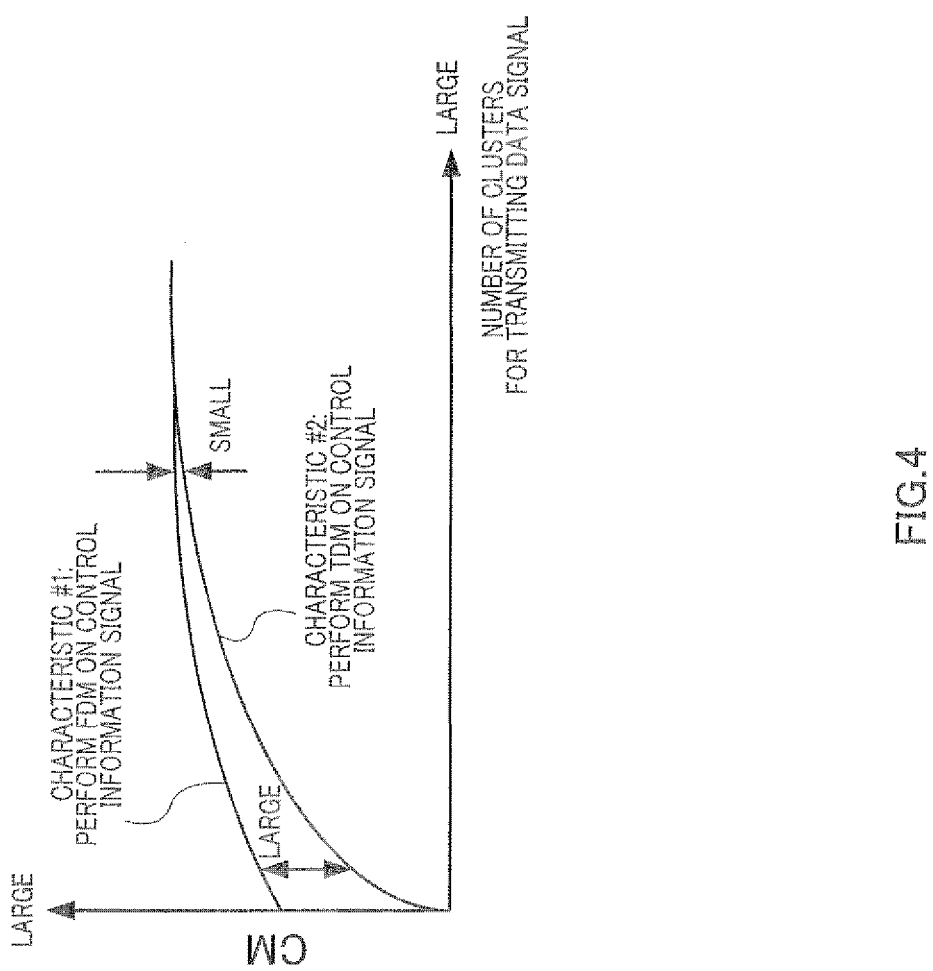
FIG. 4 is a diagram illustrating an example of relationship between the number of clusters and CM.

FIG. 4 illustrates an example of relationship between the number of clusters and CM when data signals are transmitted in multicluster-transmission in the case where control information signals are frequency division multiplexed (FDM) with data signals (characteristic #1) and in the case where control information signals are time division multiplexed (TDM) with data signals (characteristic #2).

As is clear from FIG. 4, CM increases as the number of clusters increases when the method of multiplexing data signals and control information signals is one of frequency division multiplexing and time division multiplexing. However, in the case of frequency division multiplexing, CM is large even when the number of clusters is small, and therefore the amount of increase/decrease of CM accompanying the increase in the number of clusters is smaller than the amount of increase of CM in the case of time division multiplexing. That is to say, the smaller the number of clusters, the greater is the difference between CM in frequency division multiplexing and CM in time division multiplexing and the greater the number of clusters, the smaller is the difference between CM in frequency division multiplexing and CM in time division multiplexing.

Focusing on the above described CM characteristics, the present embodiment decides/determines the method of multiplexing data signals and control information signals based on the number of clusters.

Figure 5:
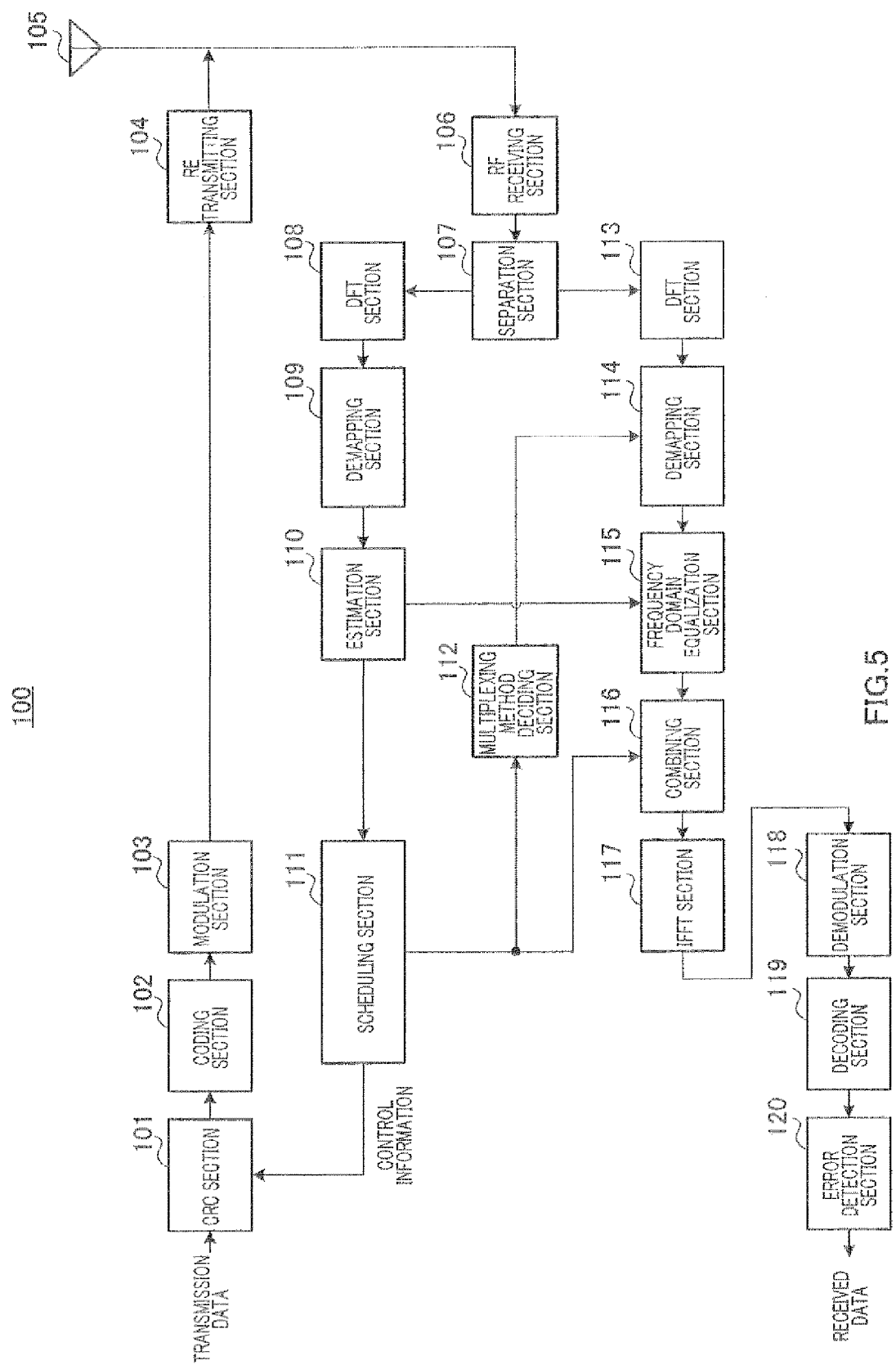
FIG. 5 is a block diagram illustrating principle components of a base station according to Embodiment 1 of the present invention.

FIG. 5 shows principle components of a base station apparatus (hereinafter abbreviated as "base station") 100 according to the present embodiment.

CRC (Cyclic Redundancy Check) section 101 performs CRC coding on transmission data and control information and generates CRC encoded data. CRC section 101 outputs the CRC encoded data generated to coding section 102.

Coding section 102 generates encoded data by encoding the CRC encoded data inputted from CRC section 101 and outputs the encoded data generated to modulation section 103.

Modulation section 103 modulates the encoded data inputted from coding section 102, generates a modulated signal and outputs the modulated signal generated to RF (Radio Frequency) transmitting section 104.

RF transmitting section 104 applies transmission processing such as D/A conversion, up-conversion, amplification to the modulated signal inputted from modulation section 103 and wirelessly transmits the transmission signal after the transmission processing from antenna 105 to each terminal apparatus (hereinafter abbreviated as "terminal").

RF receiving section 106 applies receiving processing such as down-conversion, A/D conversion to a signal from each terminal received via antenna 105 and outputs the received signal after the receiving processing to separation section 107.

Separation section 107 separates the received signal inputted from RF receiving section 106 into a reference signal and a data signal. Separation section 107 then outputs the reference signal to DFT (Discrete Fourier transform) section 108 and outputs the data signal to DFT section 113.

DFT section 108 applies DFT processing to the reference signal inputted from separation section 107 and transforms the signal from a time domain signal to a frequency domain signal. DFT section 108 then outputs the transformed frequency domain reference signal to demapping section 109.

Demapping section 109 extracts a reference signal of a portion corresponding to a transmission band of each terminal from the frequency domain reference signal inputted from DFT section 108. Demapping section 109 outputs each extracted reference signal to estimation section 110.

Estimation section 110 estimates an estimate value of frequency fluctuation in a propagation path (frequency response of propagation path) and an estimate value of receiving quality based on the reference signal inputted from demapping section 109. Estimation section 110 outputs the estimate value of frequency fluctuation in the propagation path to frequency domain equalization section 115 and outputs the estimate value of receiving quality to scheduling section 111.

Scheduling section 111 schedules resources of each terminal based on the estimate value of receiving quality inputted from estimation section 110. Furthermore, scheduling section 111 outputs the number of clusters to multiplexing method deciding section 112 as information about the multiplexing method. Furthermore, scheduling section 111 outputs a control information signal including scheduling information about an uplink and downlink to CRC section 101.

Multiplexing method deciding section 112 stores the number of clusters inputted from scheduling section 111 and decides, when RF receiving section 106 receives a data signal corresponding to this number of clusters, the method of multiplexing control information signals and data signals based on the number of clusters. The deciding method in multiplexing method deciding section 112 will be described later. Multiplexing method deciding section 112 outputs information about the decided multiplexing method to demapping section 114.

DFT section 113 applies DFT processing to the data signal inputted from separation section 107 and transforms the data signal from a time domain signal to a frequency domain signal. DFT section 113 outputs the transformed frequency domain data signal to demapping section 114.

Demapping section 114 extracts portions corresponding to the respective transmission bands of the data signal and control information signal of each terminal based on the information about the multiplexing method inputted from multiplexing method deciding section 112. Demapping section 114 outputs the extracted data signal and control information signal to frequency domain equalization section 115.

Frequency domain equalization section 115 applies equalization processing to the data signal inputted from demapping section 114 using the estimate value of frequency fluctuation in the propagation path inputted from estimation section 110. Frequency domain equalization section 115 then outputs the data signal after the equalization processing to combining section 116.

Combining section 116 combines data signals after the equalization processing divided into a plurality of clusters based on the number of clusters inputted from scheduling section 111 and outputs the combined data signal to IFFT (Inverse Fast Fourier Transform) section 117.

IFFT section 117 applies IFFT processing to the data signal after the equalization processing inputted from combining section 116 and transforms the signal into a time domain data signal. IFFT section 117 then outputs the time domain data signal to demodulation section 118.

Demodulation section 118 applies demodulation processing to the time domain data signal inputted from IFFT section 117, acquires a demodulated signal and outputs the demodulated signal to decoding section 119.

Decoding section 119 applies decoding processing to the demodulated signal inputted from demodulation section 118, acquires a decoded bit sequence and outputs the decoded bit sequence to error detection section 120.

Error detection section 120 performs error detection on the decoded bit sequence inputted from decoding section 119. Error detection section 120 performs error detection using, for example, CRC.

Figure 6:
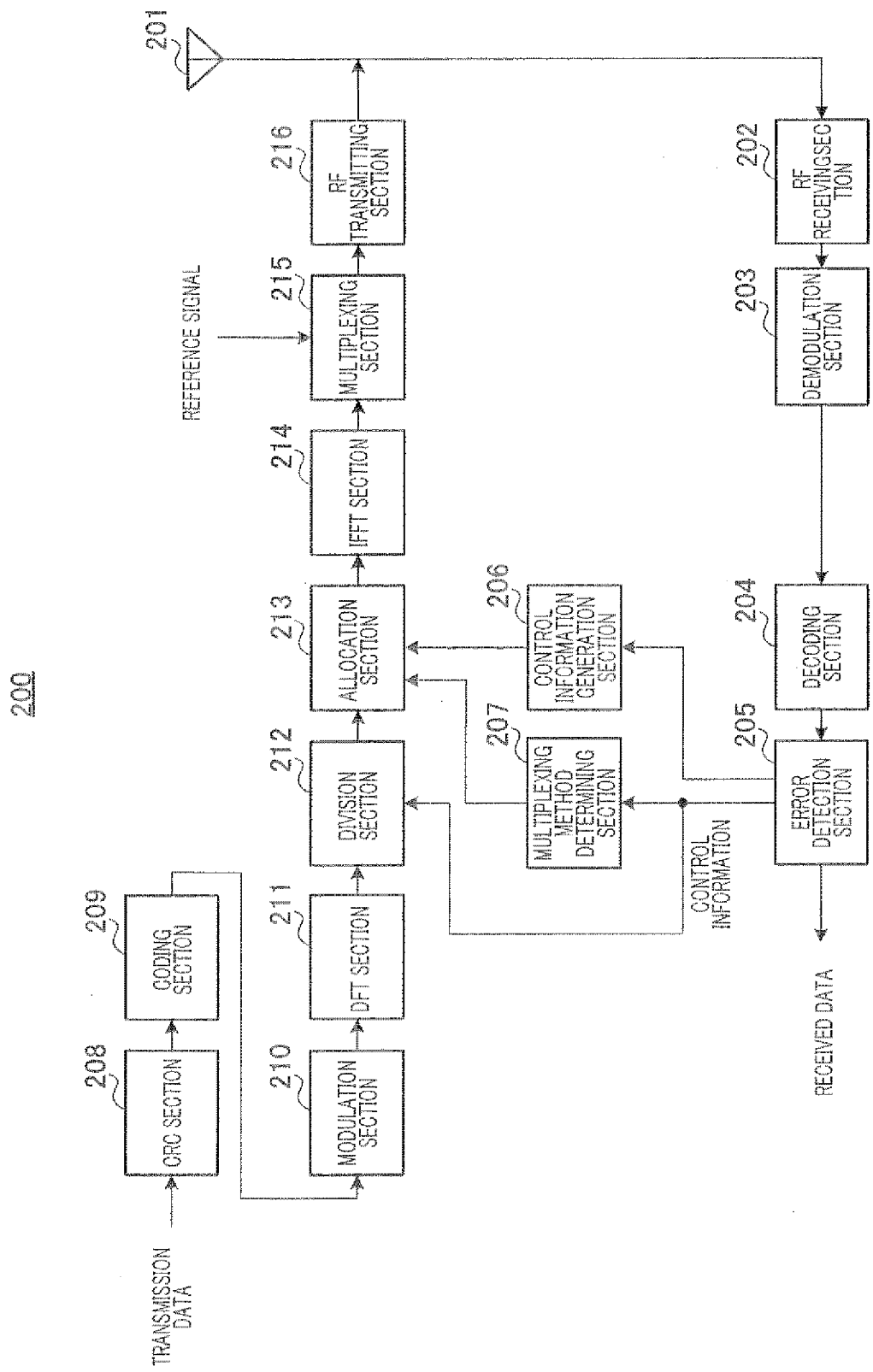
FIG. 6 is a block diagram illustrating principle components of a terminal according to Embodiment 1.

FIG. 6 illustrates principle components of terminal 200 according to the present embodiment.

RF receiving section 202 applies receiving processing such as down-conversion, A/D conversion to the signal received from the base station via antenna 201, acquires the received signal and outputs the received signal to demodulation section 203.

Demodulation section 203 applies equalization processing and demodulation processing to the received signal, acquires a demodulated signal and outputs the demodulated signal to decoding section 204.

Decoding section 204 applies decoding processing to the demodulated signal inputted from demodulation section 203, acquires decoded data and outputs the decoded data to error detection section 205.

Error detection section 205 performs error detection on the decoded data. For example, CRC check is used for error detection. Error detection section 205 decides the presence/absence of a decoding error as a result of the error detection and outputs the decision result to control information generation section 206. Furthermore, when no decoding error is detected, error detection section 205 extracts information about the number of clusters of an uplink data signal from the decoded data, outputs the information about the number of clusters to multiplexing method determining section 207 and division section 212 and outputs decoded data for the data signal as received data.

When a decoding error is detected, control information generation section 206 generates a NACK signal as a response signal or generates, when no decoding error is detected, an ACK signal as a response signal. Control information generation section 206 outputs a control information signal including the response signal to allocation section 213.

Multiplexing method determining section 207 determines a method of multiplexing control information signals and data signals based on the number of clusters of the uplink data signals inputted from error detection section 205. The determining method by multiplexing method determining section 207 will be described later. Multiplexing method determining section 207 outputs information about the determined multiplexing method to allocation section 213.

CRC section 208 performs CRC coding on transmission data, generates CRC encoded data and outputs the CRC encoded data generated to coding section 209.

Coding section 209 encodes the CRC encoded data inputted from CRC section 208, generates encoded data and outputs the encoded data generated to modulation section 210.

Modulation section 210 modulates the encoded data inputted from coding section 209, generates a data signal and outputs the data signal generated to DFT section 211.

DFT section 211 applies DFT processing to the data signal inputted from modulation section 210, transforms the data signal from a time domain data signal to a frequency domain data signal and outputs the frequency domain data signal to division section 212.

Division section 212 divides the frequency domain data signal inputted from DFT section 211 according to the number of clusters of the uplink data signal into a plurality of clusters and outputs the divided frequency domain data signals to allocation section 213.

Allocation section 213 allocates the frequency domain data signals inputted from division section 212 and the control information signals inputted from control information generation section 206 to resources based on the multiplexing method determined by multiplexing method determining section 207. Allocation section 213 outputs the data signals and control information signals after the resource allocation to IFFT section 214.

IFFT section 214 applies IFFT processing to the data signals and control information signals after the resource allocation, transforms the signals into time domain signals and outputs the time domain signals to multiplexing section 215.

Multiplexing section 215 time division multiplexes a reference signal with the time domain signal inputted from IFFT section 214, generates a multiplexed signal and outputs the generated multiplexed signal to RF transmitting section 216.

RF transmitting section 216 applies transmission processing such as D/A conversion, up-conversion, amplification to the multiplexed signal inputted from multiplexing section 215 and wirelessly transmits a transmission signal after the transmission processing from antenna 201 to the base station.

Figure 7:
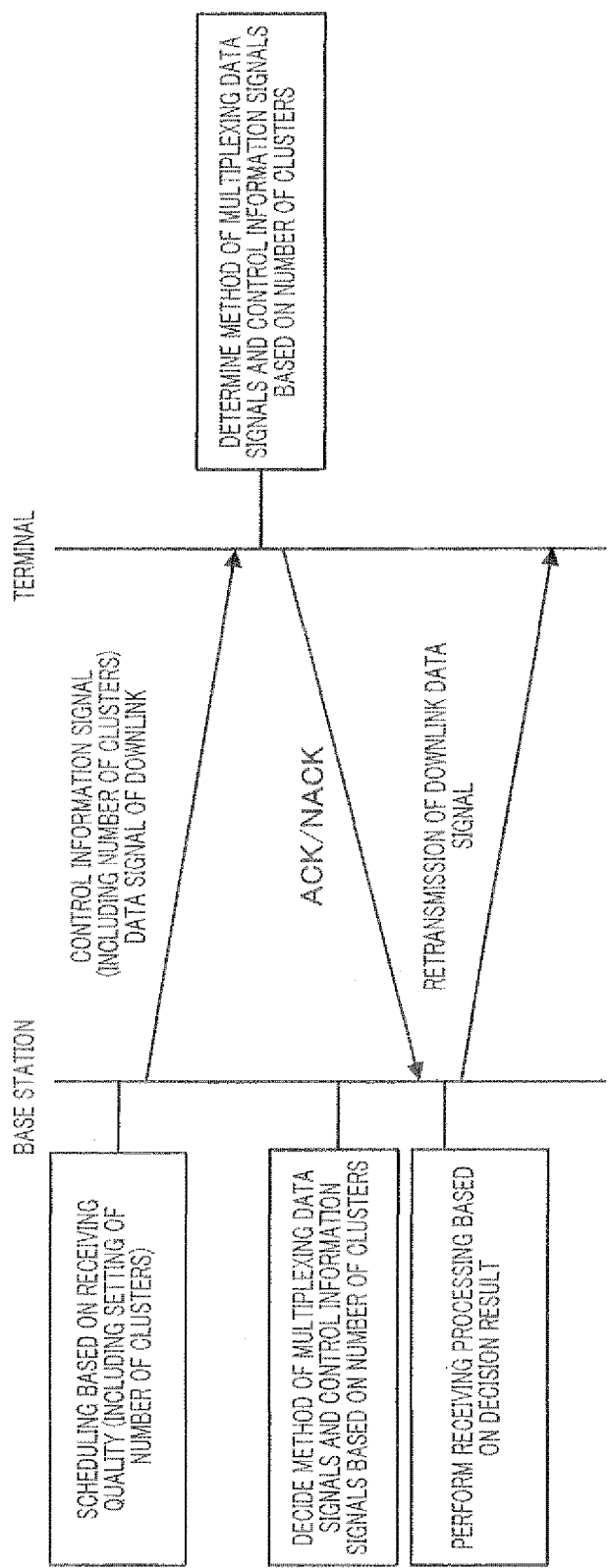
FIG. 7 is a flowchart illustrating a flow of processing of the base station and the terminal.

A processing flow of the base station and the terminal configured as described above will be described using a flowchart shown in FIG. 7.

The base station schedules resources of the terminal based on a propagation path situation such as receiving quality of the propagation path between the base station and the terminal and resource usage situation of the propagation path. Scheduling includes setting the number of clusters. The number of clusters is the number of a plurality of carrier groups to which data signals are assigned on an uplink.

The base station transmits data signals and control information signals including information about the number of clusters to the terminal on a downlink.

The terminal determines the method of multiplexing data signals and control information signals based on the number of clusters included in the downlink control information signals, multiplexes the data signals and control information signals using the determined multiplexing method and transmits the multiplexed signal to the base station.

The base station decides the method of multiplexing the data signals and control information signals using a method similar to that of the terminal based on the number of clusters determined above. The base station extracts the data signals and control information signals from the received signal based on the decided multiplexing method.

Next, the method of deciding/determining the multiplexing method in multiplexing method deciding section 112 and multiplexing method determining section 207 will be described.

[Multiplexing Method #1]

This method divides the control information signal into a first control information signal and a second control information signal, uses time division multiplexing as the method of multiplexing the data signal and first control information signal, uses frequency division multiplexing as the method of multiplexing the data signal and second control information signal, and increases the proportion of the second control information signal to the first control information signal as the number of clusters increases.

To be more specific, (1) when the number of clusters for transmitting data signals is small, a data signal and a control information signal are entirely time division multiplexed. That is to say, 100% of a control information signal is made a first control information signal and 0% of the control information signal is made a second control information signal. When control information resources are secured in advance like PUCCH in LTE, if the data signals and control information signals are time division multiplexed without using control information resources, although the efficiency of use of data resources deteriorates, it is possible to maintain low CM.

(2) When the number of clusters is medium, data signals and control information signals are multiplexed through a mixture of time division multiplexing and frequency division multiplexing. For example, X % of a control information signal is made a first control information signal and (100−X) % of the control information signal is made a second control information signal. By this means, only X % of a control information signals is time division multiplexed and (100−X) % is frequency division multiplexed.

Furthermore, (3) when the number of clusters is large, control information signal is entirely frequency division multiplexed with a data signal. That is to say, 0% of a control information signal is made a first control information signal and 100% of the control information signal is made a second control information signal. When the number of clusters is large, CM of the original data signal is large and CM does not significantly increase even when the data signal and the control information signals are frequency division multiplexed, and it is thereby possible to improve the efficiency of use of data resources by frequency division multiplexing the data signal and the control information signals.

Thus, multiplexing method determining section 207 of the terminal divides the control information signal into a first control information signal and a second control information signal, uses time division multiplexing as the method of multiplexing the data signal and the first control information signal and uses frequency division multiplexing as the method of multiplexing the data signal and the second control information signal, and increases the proportion of the second control information signal to the first control information signal as the number of clusters increases.

Figure 8:
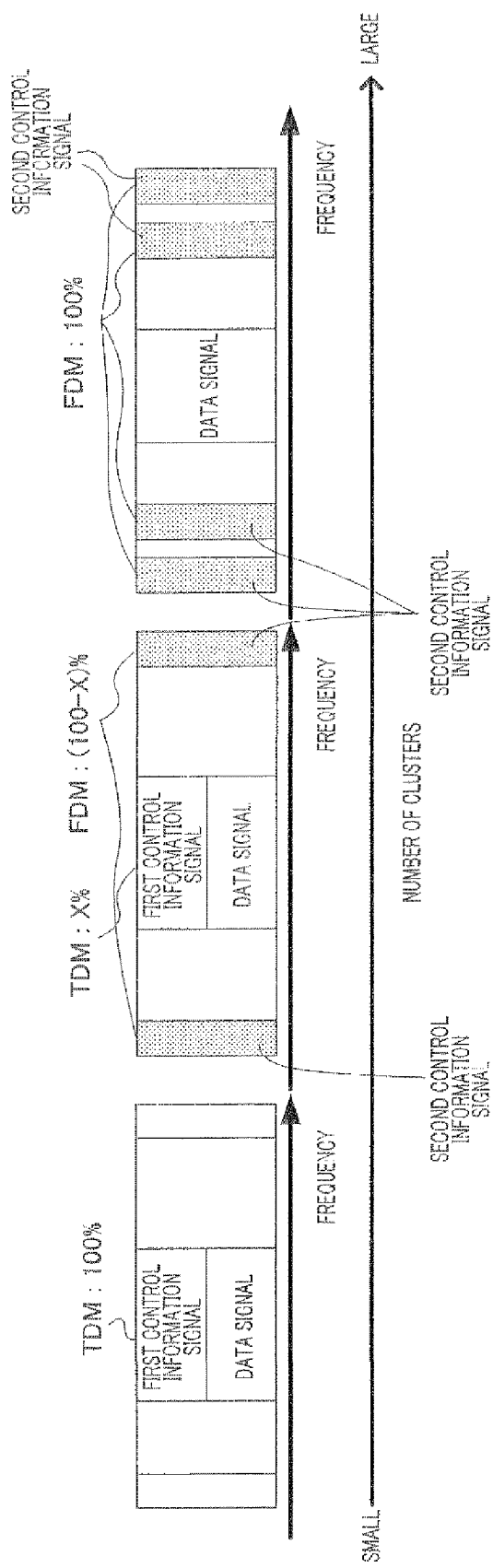
FIG. 8 is a diagram illustrating an example of resource allocation using [multiplexing method #1] according to Embodiment 1.

FIG. 8 shows resource allocation using [multiplexing method #1].

Multiplexing method deciding section 112 of the base station divides the control information signal into the first control information signal and the second control information signal, when the first control information signal is time division multiplexed with the data signal and when the second control information signal is frequency division multiplexed with the data signal, the proportion of the second control information signal to the first control information signal is increased as the number of clusters increases as in the case of multiplexing method determining section 207.

[Multiplexing Method #2]

This method provides threshold Th1 for the number of clusters and determines the multiplexing method based on the threshold decision result of the number of clusters against threshold Th1. To be more specific, when the number of clusters is less than Th1, 100% of a control information signal is time division multiplexed with a data signal, and, when the number of clusters is equal to or above Th1, 100% of a control information signal is frequency division multiplexed with a data signal.

Here, when threshold Th1 is set to 2, the multiplexing method is switched between single-carrier transmission (in which the number of clusters is 1) and multicluster transmission (in which the number of clusters is 2 or above). That is to say, data signals and control information signals are time division multiplexed in the case of single-carrier transmission, and data signals and control information signals are frequency division multiplexed in the case of multicluster transmission.

Thus, multiplexing method determining section 207 of the terminal uses time division multiplexing as the multiplexing method when the number of clusters is less than threshold Th1 and uses frequency division multiplexing as the multiplexing method when the number of clusters is equal to or above threshold Th1.

Figure 9:
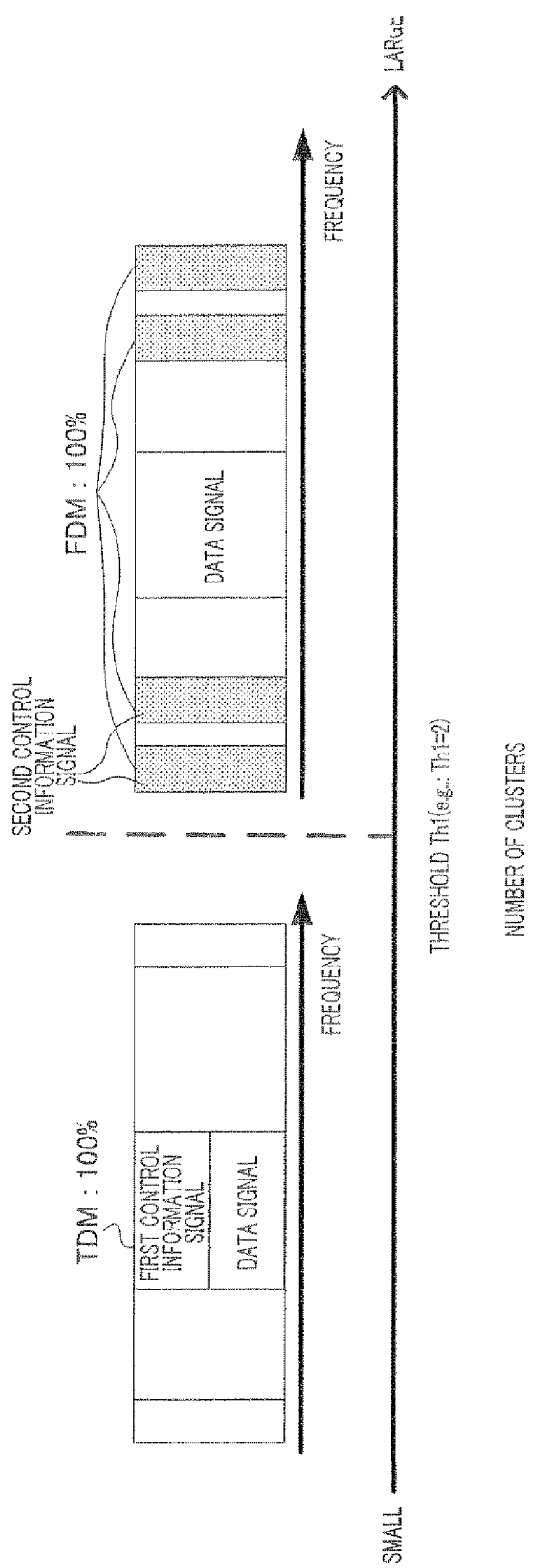
FIG. 9 is a diagram illustrating an example of resource allocation using [multiplexing method #2] according to Embodiment 1.

FIG. 9 shows resource allocation using [multiplexing method #2].

As described above, CM is greater in multicluster transmission than in single-carrier transmission. Therefore, by setting threshold Th1 to 2, a control information signal is entirely time division multiplexed with a data signal in single-carrier transmission, making it possible to maintain low CM. Therefore, by using [multiplexing method #2], in a radio communication system in which single-carrier transmission and multicluster transmission are both used, it is possible to adjust the relationship between a low-CM characteristic which is an advantage of single-carrier transmission and the efficiency of use of data resources which is inconsistent therewith and an advantage of multicluster transmission.

As with multiplexing method determining section 207, multiplexing method deciding section 112 of the base station uses time division multiplexing as the multiplexing method when the number of clusters is less than threshold Th1 and uses frequency division multiplexing as the multiplexing method when the number of clusters is equal to or above threshold Th1.

[Multiplexing Method #3]

This method determines the multiplexing method based on the margin of transmission power of the terminal. Here, examples of the margin of transmission power include the difference between the maximum transmission power of the terminal and the transmission power in data transmission using the number of clusters designated by the base station.

Figure 10:
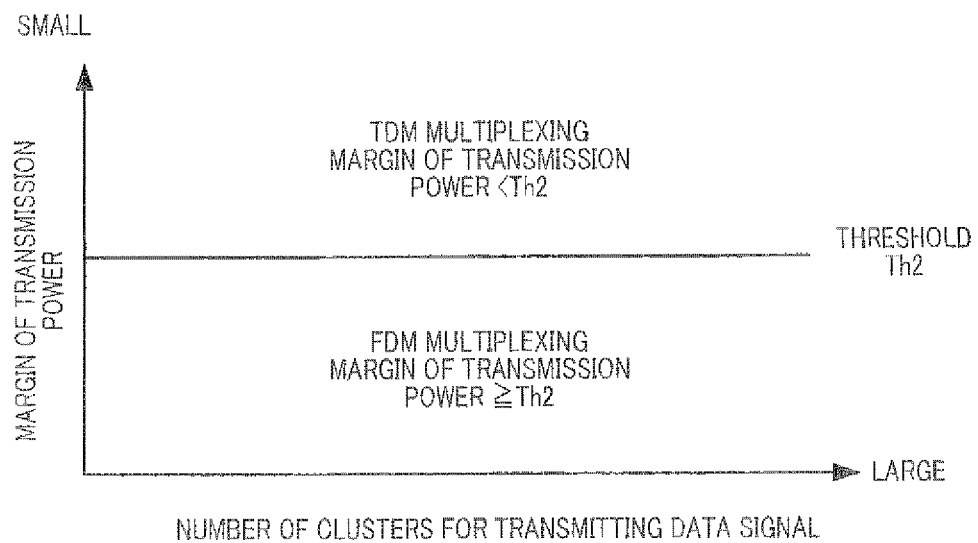
FIG. 10 is a diagram illustrating an example of resource allocation using [multiplexing method #3] according to Embodiment 1.

The multiplexing method is determined based on a threshold decision result of transmission power margin against threshold Th2. [Multiplexing method #3] will be described using FIG. 10. In FIG. 10, the horizontal axis shows the number of clusters for transmitting a data signal and the vertical axis shows the margin of transmission power.

In the example shown in FIG. 10, time division multiplexing is used as the multiplexing method when the margin of transmission power<Th2 and frequency division multiplexing is used as the multiplexing method when the margin of transmission power Th2.

Figure 11:
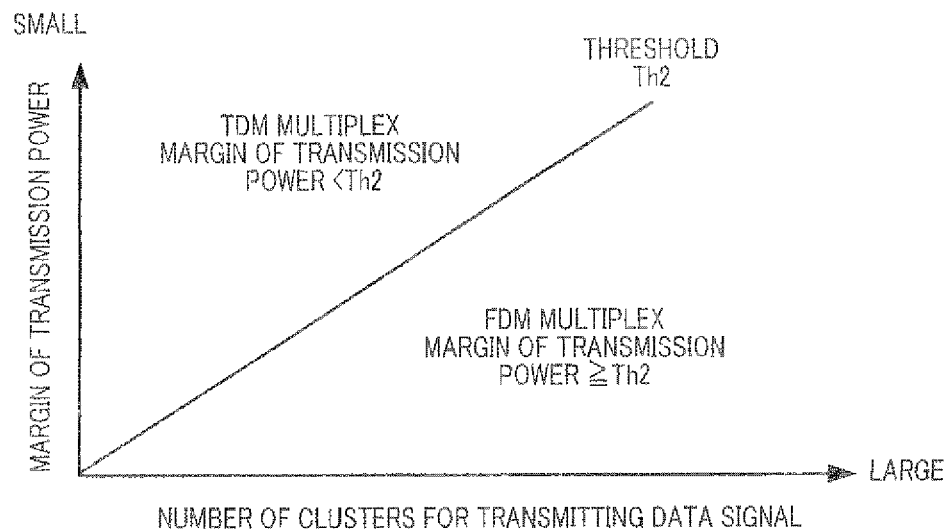
FIG. 11 is a diagram illustrating another example of resource allocation using [multiplexing method #3] according to Embodiment 1.

A threshold decision may also be made using threshold Th2 set according to the number of clusters for transmitting uplink data signals. For example, smaller threshold Th2 may be used for a greater number of clusters. FIG. 11 shows a relationship between transmission power margin and threshold Th2 corresponding to the number of clusters. In this case, as with FIG. 10, time division multiplexing is used as the multiplexing method when the margin of transmission power<Th2 and frequency division multiplexing is used as the multiplexing method when the margin of transmission power Th2.

Thus, multiplexing method determining section 207 of the terminal uses time division multiplexing as the multiplexing method when the margin of transmission power is less than threshold Th2 and uses frequency division multiplexing as the multiplexing method when the margin of transmission power is equal to or above Th2.

As with multiplexing method determining section 207, multiplexing method deciding section 112 of the base station uses time division multiplexing as the multiplexing method when the margin of transmission power is less than threshold Th2 and uses frequency division multiplexing as the multiplexing method when the margin of transmission power is equal to or above threshold Th2.

[Multiplexing Method #4]

This method determines the multiplexing method based on a threshold decision result of the number of clusters against threshold Th1 and a threshold decision result of transmission power margin against threshold Th2. [Multiplexing method #4] will be described using FIG. 12 and FIG. 13.

Figure 12:
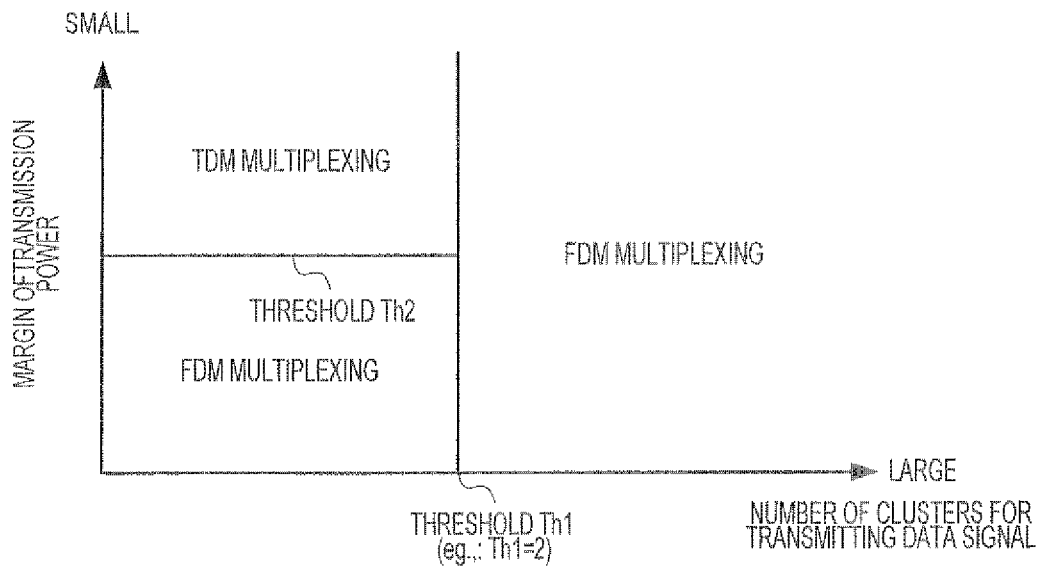
FIG. 12 is a diagram illustrating another example of resource allocation using [multiplexing method #4] according to Embodiment 1.
Figure 13:
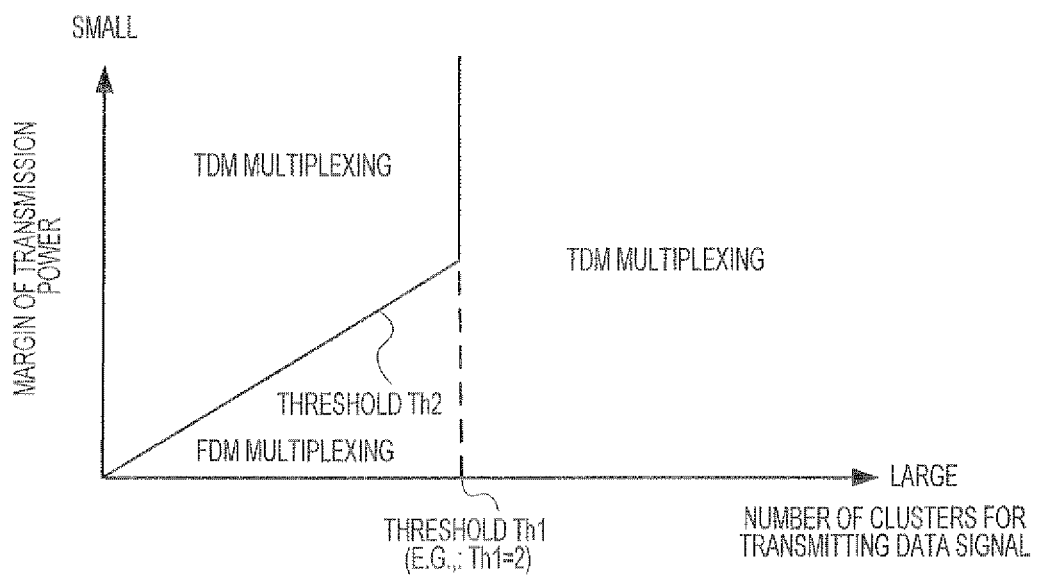
FIG. 13 is a diagram illustrating a further example of resource allocation using [multiplexing method #4] according to Embodiment 1.

As with [multiplexing method #2], when the number of clusters is equal to or above threshold Th1 as shown in FIG. 12 and FIG. 13, multiplexing method deciding section 112 and multiplexing method determining section 207 use frequency division multiplexing as the multiplexing method. On the other hand, when the number of clusters is less than threshold Th1, multiplexing method deciding section 112 and multiplexing method determining section 207 make a threshold decision of transmission power margin against threshold Th2, decide/determine that frequency division multiplexing is the multiplexing method when the margin of transmission power is equal to or above threshold Th2 and uses time division multiplexing as the multiplexing method when the margin of transmission power is less than threshold Th2.

As described above, in the present embodiment, multiplexing method deciding section 112 and multiplexing method determining section 207 decide/determine the method of multiplexing data signals and control information signals based on the number of clusters. For example, multiplexing method determining section 207 divides a control information signal into a first control information signal and a second control information signal, uses time division multiplexing as the method of multiplexing a data signal and a first control information signal, uses frequency division multiplexing as the method of multiplexing a data signal and a second control information signal and increases the proportion of the second control information signal to the first control information signal as the number of clusters increases. Furthermore, when a control information signal is divided into a first control information signal and a second control information signal, the first control information signal is time division multiplexed with the data signal and the second control information signal is frequency division multiplexed with the data signal, multiplexing method deciding section 112 assumes that the proportion of the second control information signal to the first control information signal is greater as the number of clusters increases as with multiplexing method determining section 207.

Furthermore, multiplexing method deciding section 112 and multiplexing method determining section 207 time division multiplex 100% of a control information signal with a data signal when the number of clusters is less than Th1 and frequency division multiplex 100% of a control information signal with a data signal when the number of clusters is equal to or above Th1. Thus, in a radio communication system in which single-carrier transmission and multicluster transmission are both used, it is thereby possible to adjust the relationship between a low-CM characteristic which is an advantage of single-carrier transmission and the efficiency of use of data resources which is inconsistent therewith and an advantage of multicluster transmission.

Furthermore, multiplexing method deciding section 112 and multiplexing method determining section 207 decide/determine the multiplexing method based on a threshold decision result of transmission power margin against threshold Th2. In this case, when threshold Th2 of a smaller value is used as the number of clusters increases, it is possible to use frequency division multiplexing for a terminal having a smaller influence of the amount of increase of CM through frequency division multiplexing to reduce the deterioration of resource utilization efficiency and flexibly set the multiplexing method according to the communication situation of the terminal.

Furthermore, multiplexing method deciding section 112 and multiplexing method determining section 207 determine the multiplexing method based on a threshold decision result of the number of clusters against threshold Th1 and a threshold decision result of transmission power margin against threshold Th2. When, for example, the number of clusters is equal to or above threshold Th1, multiplexing method deciding section 112 and multiplexing method determining section 207 use frequency division multiplexing as the multiplexing method. On the other hand, when the number of clusters is less than threshold Th1 and the margin of transmission power is equal to or above threshold Th2, multiplexing method deciding section 112 and multiplexing method determining section 207 use frequency division multiplexing as the multiplexing method. On the other hand, when the number of clusters is less than threshold Th1 and the margin of transmission power is less than threshold Th2, multiplexing method deciding section 112 and multiplexing method determining section 207 use time division multiplexing as the multiplexing method.

Embodiment 2

A case has been described in Embodiment 1 where the method of multiplexing data signals and control information signals is decided/determined based on the number of clusters. The present embodiment will describe a case where the method of multiplexing data signals and control information signals is decided/determined based on the number of component carriers for transmitting uplink data signals. Here, the "component carrier" refers to a frequency band independently operated in LTE-Advanced and the "number of component carriers" refers to the number of component carriers in a radio communication system. LTE-Advanced supports a plurality of component carriers. Studies are underway to operate each component carrier (e.g. 20 MHz) independently as with LTE, and data signals and control information signals are multiplexed independently for each component carrier.

Since principle components of a base station according to the present embodiment are the same as in Embodiment 1, descriptions thereof will be omitted. The present embodiment is different from Embodiment 1 in the method of deciding the multiplexing method in multiplexing method deciding section 112. The method of deciding the multiplexing method in multiplexing method deciding section 112 according to the present embodiment will be described later.

Figure 14:
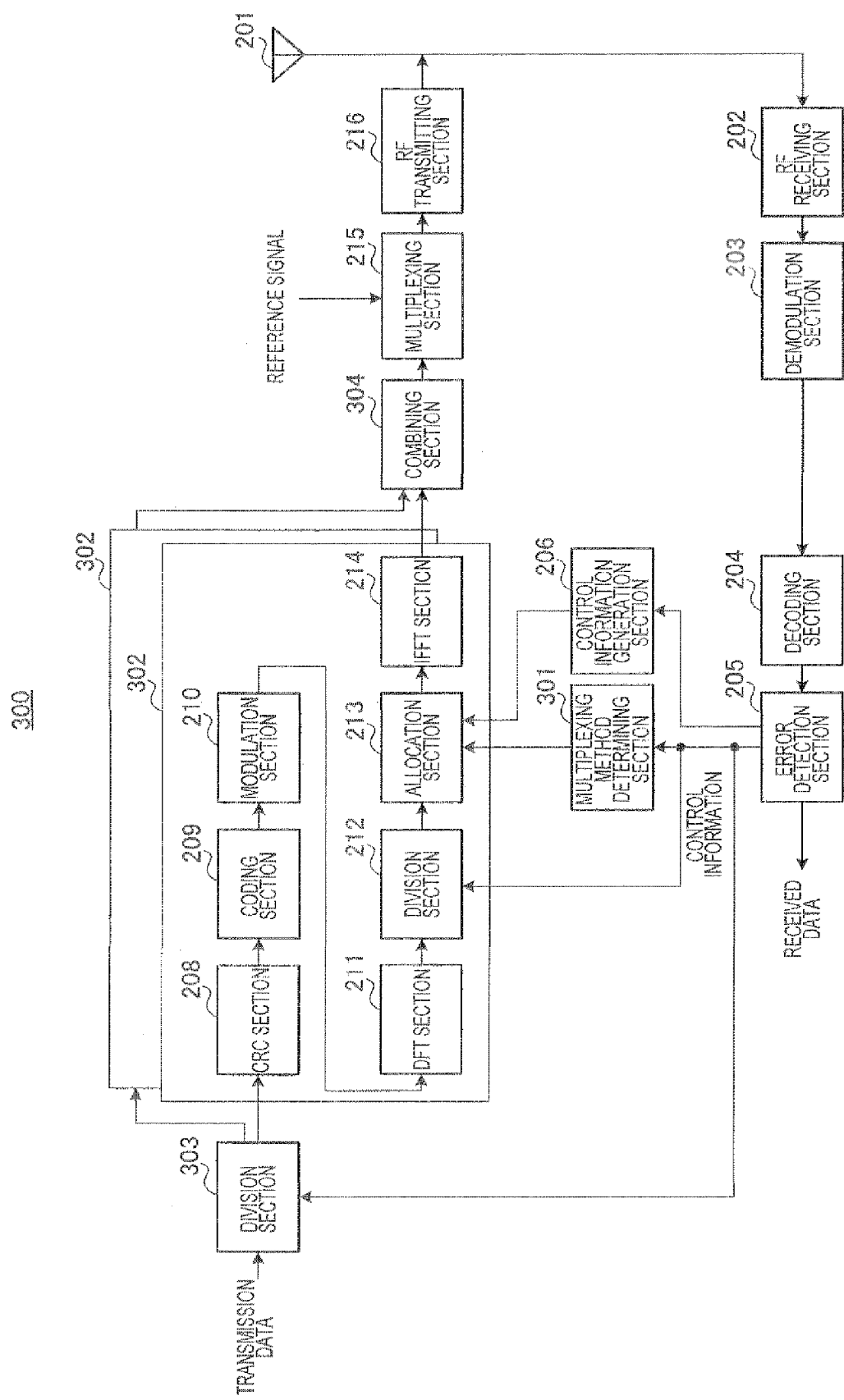
FIG. 14 is a block diagram illustrating principle components of a terminal according to Embodiment 2 of the present invention.

FIG. 14 shows principle components of the terminal according to the present embodiment. In terminal 300 in FIG. 14, the same components as those in FIG. 6 will be assigned the same reference numerals and descriptions thereof will be omitted. Terminal 300 in FIG. 14 is provided with multiplexing method determining section 301 instead of multiplexing method determining section 207 of terminal 200 in FIG. 6. Furthermore, terminal 300 in FIG. 14 is provided with a plurality of coding/modulation sections 302, one per component carrier, and is provided with division section 303 that divides transmission data and outputs the divided transmission data to coding/modulation section 302 and combining section 304 that combines a plurality of time domain signals outputted from coding/modulation section 302.

Multiplexing method deciding section 112 and multiplexing method determining section 301 according to the present embodiment decide/determine the multiplexing method based on the number of component carriers for transmitting uplink data signals.

Hereinafter, the method of deciding/determining the multiplexing method in multiplexing method deciding section 112 and multiplexing method determining section 301 will be described.

[Multiplexing Method #1]

This method divides a control information signal into a first control information signal and a second control information signal, uses time division multiplexing as the method of multiplexing a data signal and the first control information signal, uses frequency division multiplexing as the method of multiplexing a data signal and the second control information signal and increases the proportion of the second control information signal to the first control information signal as the number of component carriers increases.

To be more specific, (1) when the number of component carriers for transmitting data signals is small, a data signal and a control information signals are entirely time division multiplexed. That is to say, 100% of a control information signal is made a first control information signal and 0% of the control information signal is made a second control information signal.

(2) When the number of component carriers is medium, data signals and control information are multiplexed through a mixture of time division multiplexing and frequency division multiplexing. For example, suppose X % of a control information signal is made a first control information signal and (100−X) % of the control information signal is made a second control information signal. Thus, only X % of a control information signal is time division multiplexed and (100−X) % is frequency division multiplexed.

Furthermore, (3) when the number of component carriers is large, a control information signal is entirely frequency division multiplexed with a data signal. That is to say, 0% of a control information signal is made a first control information signal and 100% of the control information signal is made a second control information signal.

Thus, multiplexing method determining section 301 of the terminal divides a control information signal into a first control information signal and a second control information signal, uses time division multiplexing as the method of multiplexing the data signal and first control information signal, and uses frequency division multiplexing as the method of multiplexing the data signal and the second control information signal and increases the proportion of the second control information signal to the first control information signal as the number of component carriers increases.

Figure 15:
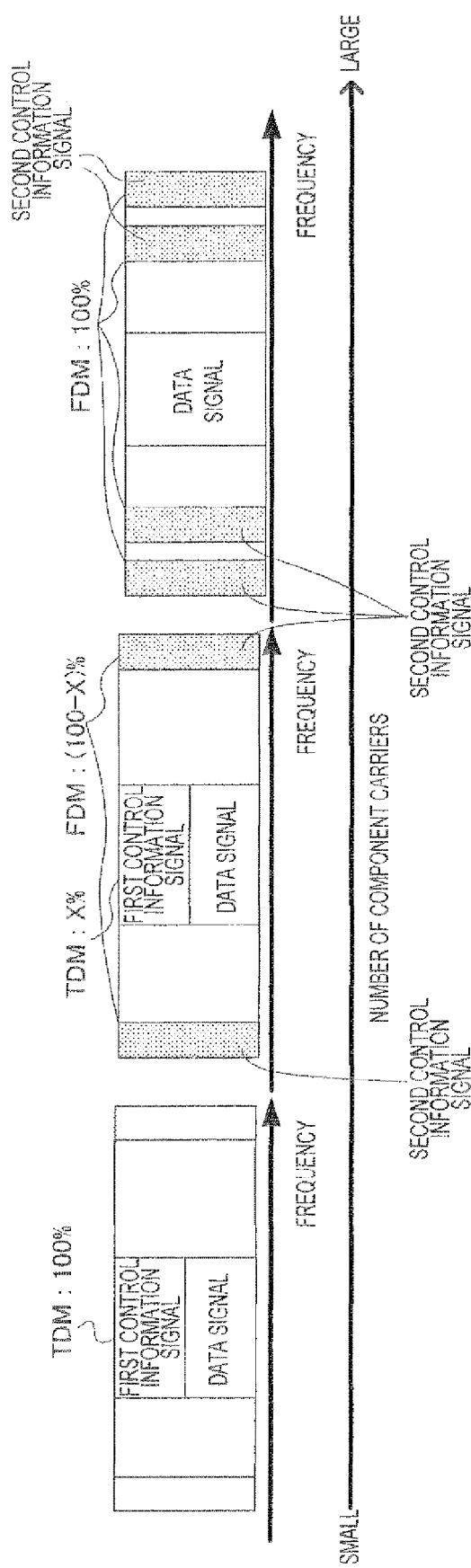
FIG. 15 is a diagram illustrating an example of resource allocation using [multiplexing method #1] according to Embodiment 2.

FIG. 15 shows resource allocation using [multiplexing method #1].

When a control information signal is divided into a first control information signal and a second control information signal, the first control information signal is time division multiplexed with the data signal and the second control information signal is frequency division multiplexed with the data signal, multiplexing method deciding section 112 of the base station assumes that the proportion of the second control information signal to the first control information signal increases as the number of component carriers increases as with multiplexing method determining section 301.

[Multiplexing Method #2]

This method provides threshold Th11 for the number of component carriers and determines the multiplexing method based on a threshold decision result of the number of component carriers against threshold Th11. To be more specific, 100% of a control information signal is time division multiplexed with a data signal when the number of component carriers is less than Th11, and 100% of a control information signal is frequency division multiplexed with a data signal when the number of component carriers is equal to or above Th11.

Figure 16:
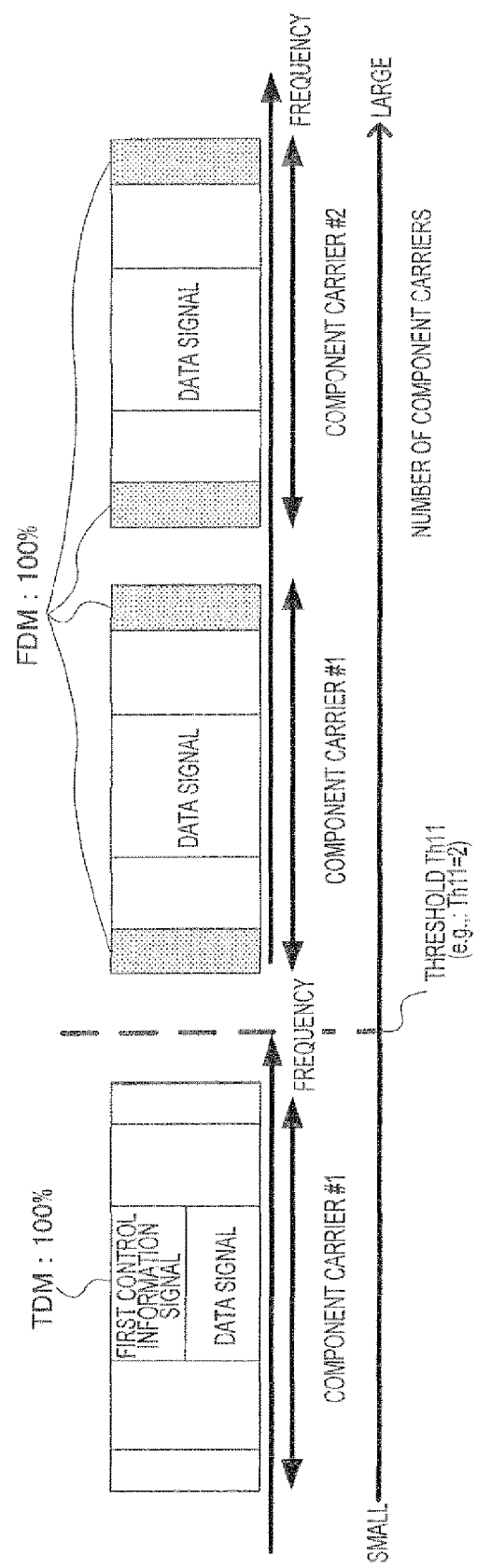
FIG. 16 is a diagram illustrating an example of resource allocation using [multiplexing method #2] according to Embodiment 2.

FIG. 16 shows resource allocation using [multiplexing method #2].

When the number of component carriers increases, the number of discontinuous carrier groups to which data signals are assigned increases. Especially, when the number of component carriers increases from 1 to 2, the number of discontinuous carrier groups is always 2 or more, and it is therefore difficult to maintain low CM. Therefore, with threshold Th11 set to 2, it is possible to improve the efficiency of use of data resources by time division multiplexing data signals and control information signals when the number of component carriers is 1 and low CM can be expected through single-carrier transmission and by frequency division multiplexing data signals and control information signals when the number of component carriers is 2 or more and it is difficult to maintain low CM.

As with multiplexing method determining section 301, multiplexing method deciding section 112 of the base station uses time division multiplexing as the multiplexing method when the number of component carriers is less than threshold Th11 and uses frequency division multiplexing as the multiplexing method when the number of component carriers is equal to or above threshold Th11.

[Multiplexing Method #3]

This method determines the multiplexing method based on the margin of transmission power of the terminal. Here, examples of the margin of transmission power include the difference between the maximum transmission power of the terminal and the transmission power in data transmission using the number of component carriers designated by the base station.

Figure 17:
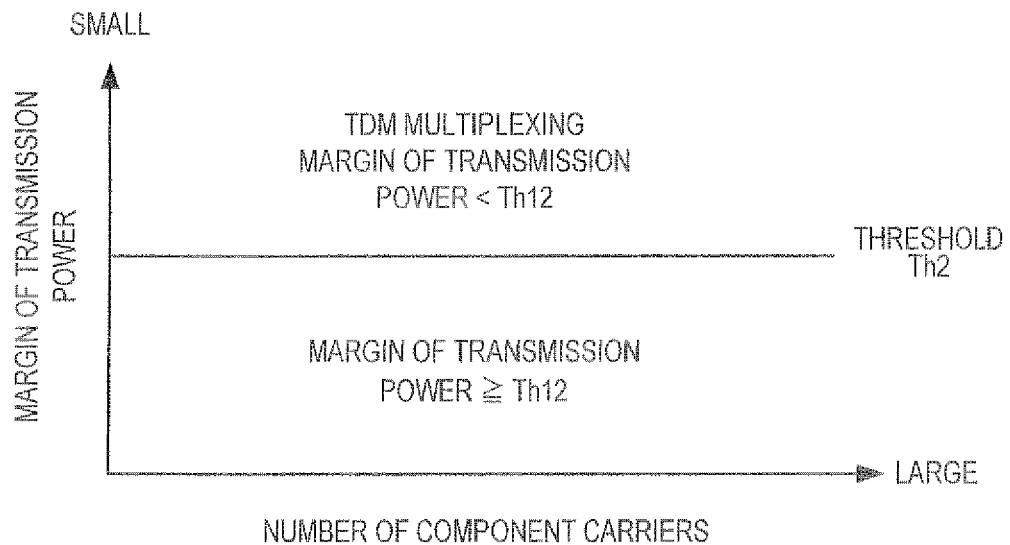
FIG. 17 is a diagram illustrating an example of resource allocation using [multiplexing method #3] according to Embodiment 2.

The multiplexing method is determined based on a threshold decision result of transmission power margin against threshold Th12. [Multiplexing method #3] will be described using FIG. 17. In FIG. 17, the horizontal axis shows the number of component carriers for transmitting data signals and the vertical axis shows the margin of transmission power.

In the example shown in FIG. 17, time division multiplexing is used as the multiplexing method when the margin of transmission power<Th12 and frequency division multiplexing is used as the multiplexing method when the margin of transmission power≥Th12.

Figure 18:
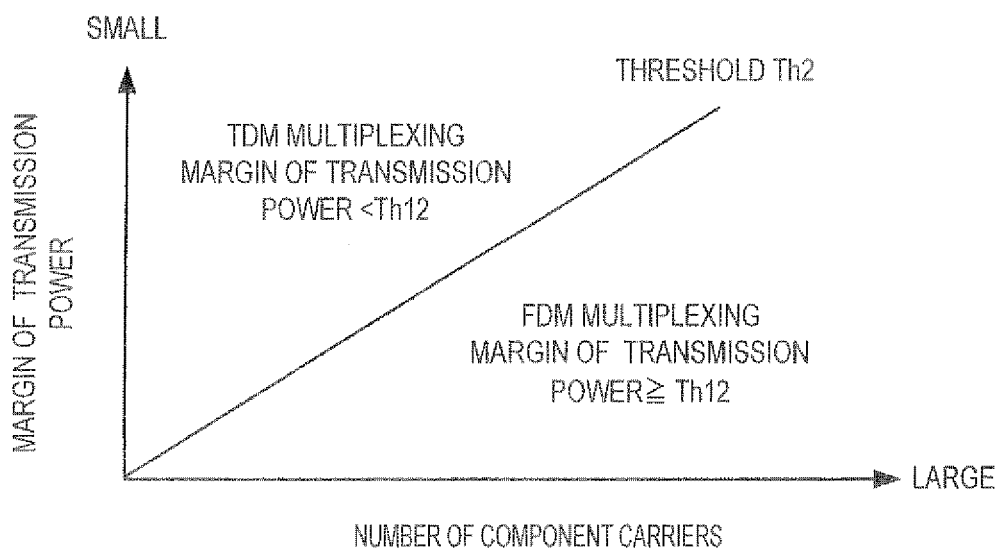
FIG. 18 is a diagram illustrating a further example of resource allocation using [multiplexing method #3] according to Embodiment 2.

A threshold decision may also be made using threshold Th12 set according to the number of component carriers for transmitting uplink data signals. For example, smaller threshold Th12 may be used as the number of component carriers increases. FIG. 18 shows a relationship between transmission power margin and threshold Th12 corresponding to the number of component carriers. In this case, as with FIG. 17, frequency division multiplexing is used as the multiplexing method when the margin of transmission power≥Th12 and time division multiplexing is used as the multiplexing method when the margin of transmission power<Th12 and frequency division multiplexing is used as the multiplexing method when the margin of transmission power Th12.

Thus, multiplexing method determining section 301 of the terminal uses time division multiplexing as the multiplexing method when the margin of transmission power is less than threshold Th12 and uses frequency division multiplexing as the multiplexing method when the margin of transmission power is equal to or above threshold Th12.

As with multiplexing method determining section 301, multiplexing method deciding section 112 of the base station uses time division multiplexing as the multiplexing method when the margin of transmission power is less than threshold Th12 and uses frequency division multiplexing as the multiplexing method when the margin of transmission power is equal to or above threshold Th12.

[Multiplexing Method #4]

This method determines the multiplexing method based on a threshold decision result of the number of clusters against threshold Th11 and a threshold decision result of transmission power margin against threshold Th12. [Multiplexing method #4] will be described using FIG. 19 and FIG. 20.

Figure 19:
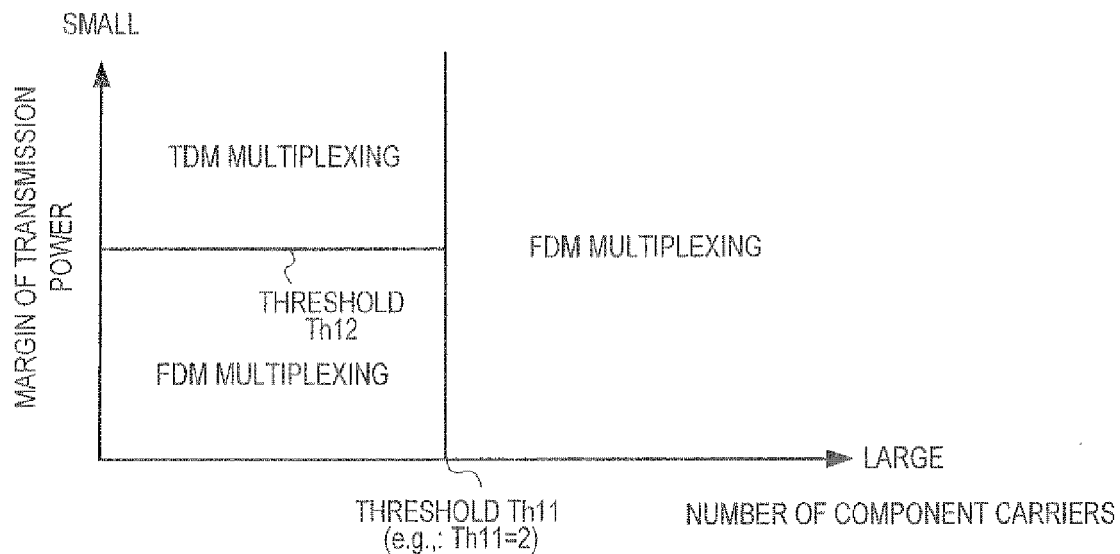
FIG. 19 is a diagram illustrating another example of resource allocation using [multiplexing method #4] according to Embodiment 2.
Figure 20:
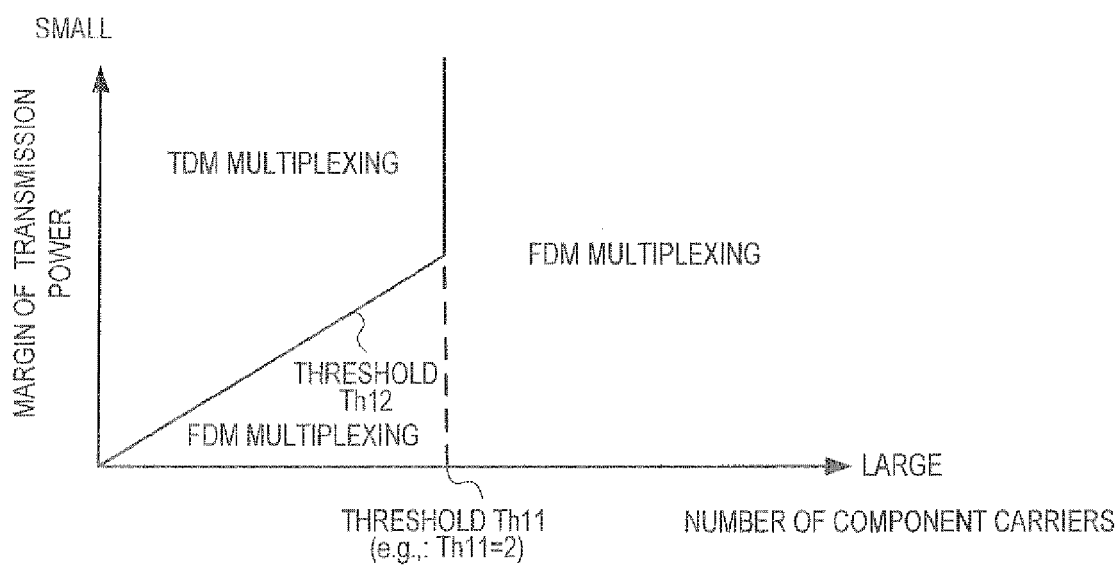
FIG. 20 is a diagram illustrating a further example of resource allocation using [multiplexing method #4] according to Embodiment 2.

As shown in FIG. 19 and FIG. 20, when the number of component carriers is equal to or above threshold Th11, as with [Multiplexing method #2], multiplexing method deciding section 112 and multiplexing method determining section 301 decide/determine that frequency division multiplexing is the multiplexing method. On the other hand, when the number of component carriers is less than threshold Th11, multiplexing method deciding section 112 and multiplexing method determining section 301 make a threshold decision on the margin of transmission power against threshold Th12, decide/determine that frequency division multiplexing is the multiplexing method when the margin of transmission power is equal to or above threshold Th12 and decide/determine that time division multiplexing is the multiplexing method when the margin of transmission power is less than threshold Th12.

As described above, in the present embodiment, multiplexing method determining section 301 divides a control information signal into a first control information signal and a second control information signal, uses time division multiplexing as the method of multiplexing the data signal and the first control information signal, uses frequency division multiplexing as the method of multiplexing the data signal and the second control information signal and increases the proportion of the second control information signal to the first control information signal as the number of component carriers increases. Furthermore, when the control information signal is divided into a first control information signal and a second control information signal, the first control information signal is time division multiplexed with the data signal and the second control information signal is frequency division multiplexed with the data signal, multiplexing method deciding section 112 assumes that the proportion of the second control information signal to the first control information signal increases as the number of component carriers increases as with multiplexing method determining section 301.

Furthermore, multiplexing method deciding section 112 and multiplexing method determining section 301 time division Multiplexes 100% of a control information signal with a data signal when the number of component carriers is less than Th11, and frequency division multiplexes 100% of a control information signal with a data signal when the number of component carriers is equal to or above Th11. Thus, when the number of component carriers is 1 and low CM can be expected through single-carrier transmission, the data signal and control information signal are time division multiplexed and when the number of component carriers is 2 or above and it is difficult to maintain low CM, the data signal and control information signal are frequency division multiplexed, and it is thereby possible to improve the efficiency of use of data resources.

Furthermore, multiplexing method deciding section 112 and multiplexing method determining section 301 decide/determine the multiplexing method based on a threshold decision result of transmission power margin against threshold Th12. When, for example, threshold Th12 of a smaller value is used as the number of component carriers increases, it is possible to use frequency division multiplexing for a terminal receiving a smaller influence of the amount of increase of CM by frequency division multiplexing, thereby prevent the efficiency of use of resources from deteriorating and flexibly set the multiplexing method according to the communication situation of the terminal.

Furthermore, multiplexing method deciding section 112 and multiplexing method determining section 301 determine the multiplexing method based on a threshold decision result of the number of component carriers against threshold Th11 and a threshold decision result of transmission power margin against threshold Th12. When, for example, the number of component carriers is equal to or above threshold Th11, multiplexing method deciding section 112 and multiplexing method determining section 301 use frequency division multiplexing as the multiplexing method. On the other hand, when the number of component carriers is less than threshold Th11 and the margin of transmission power is equal to or above threshold Th12, multiplexing method deciding section 112 and multiplexing method determining section 301 use frequency division multiplexing as the multiplexing method. Furthermore, when the number of component carriers is less than threshold Th11 and the margin of transmission power is less than threshold Th12, multiplexing method deciding section 112 and multiplexing method determining section 301 use time division multiplexing as the multiplexing method.

Embodiment 3

Embodiment 2 has described the multiplexing method when a data signal is transmitted with each component carrier. The present embodiment will describe a method of multiplexing a data signal with a control information signal when there is a component carrier that transmits only a control information signal of a plurality of component carriers.

When there is at least one component carrier that transmits only a control information signal, the present embodiment uses frequency division multiplexing as the method of multiplexing the control information signal and data signal for all component carriers.

Since the principle components of the base station according to the present embodiment are the same as in Embodiment 2, descriptions thereof will be omitted. The present embodiment differs from Embodiment 2 in the method of deciding the multiplexing method in multiplexing method deciding section 112.

Multiplexing method deciding section 112 according to the present embodiment, decides the presence/absence of component carriers for transmitting only control information signals of the plurality of component carriers based on information about each component carrier inputted from scheduling section 111. When at least one of the plurality of component carriers transmits only control information signals, multiplexing method deciding section 112 decides on frequency division multiplexing as the method of multiplexing control information signals and data signals for all the component carriers.

Figure 21:
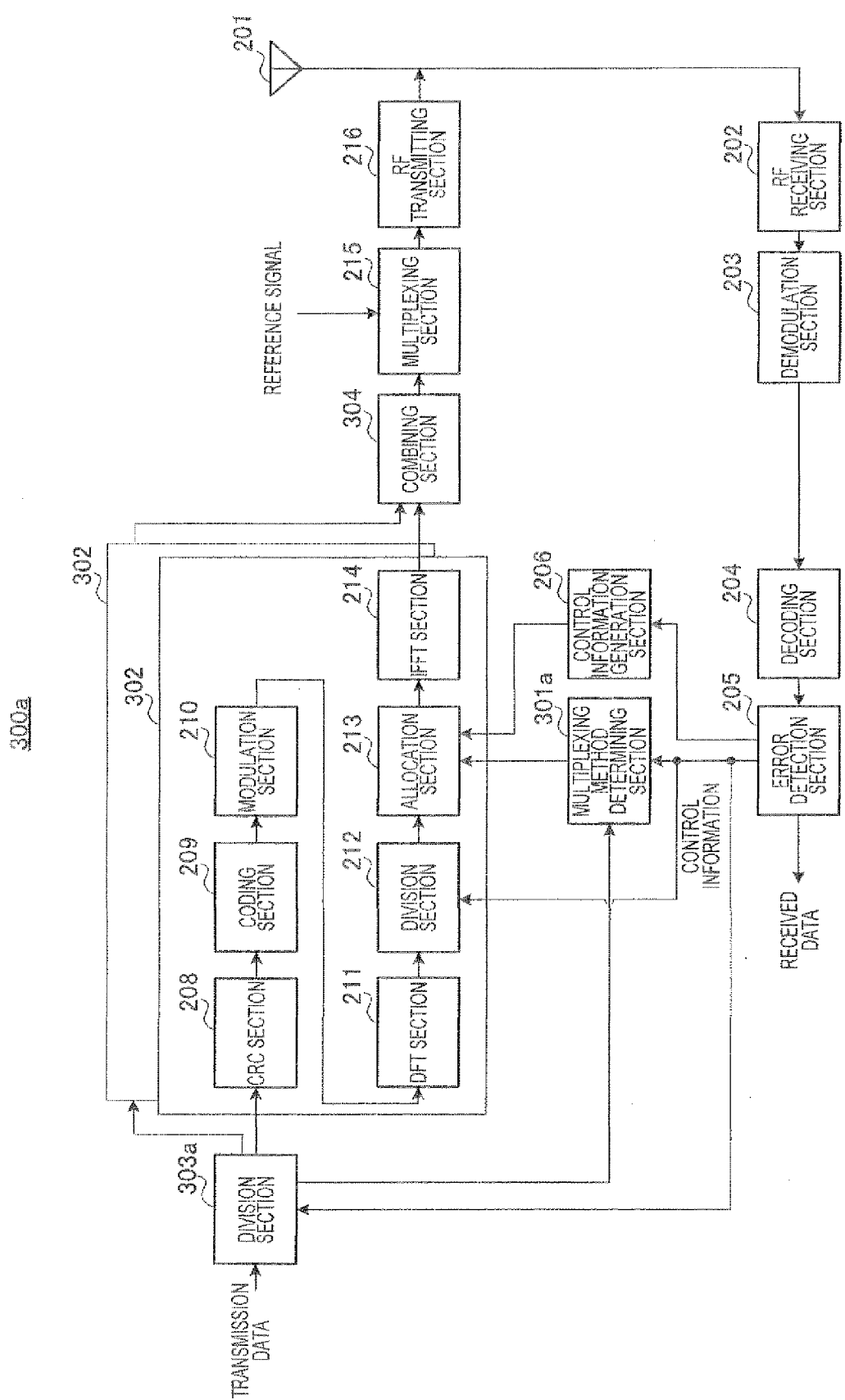
FIG. 21 is a block diagram illustrating principle components of a terminal according to Embodiment 3 of the present invention.

FIG. 21 illustrates principle components of a terminal according to the present embodiment. In FIG. 21, the same components as those in FIG. 14 will be assigned the same reference numerals and descriptions thereof will be omitted. Terminal 300a in FIG. 21 is provided with division section 303a and multiplexing method determining section 301a instead of division section 303 and multiplexing method determining section 301 of terminal 300 in FIG. 14.

Division section 303a outputs information about whether or not transmission data is allocated to each component carrier to multiplexing method determining section 301a.

Multiplexing method determining section 301a decides the presence/absence of a component carrier for transmitting only control information signals of a plurality of component carriers using the information about whether or not transmission data is allocated to each component carrier. When at least one of the plurality of component carriers transmits only control information signals, multiplexing method determining section 301a decides on frequency division multiplexing as the method of multiplexing control information signals and data signals for all the component carriers.

Thus, when at least one of the plurality of component carriers transmits only control information signals, the present embodiment frequency division multiplexes control information signals and data signals for all the component carriers.

Figure 22:
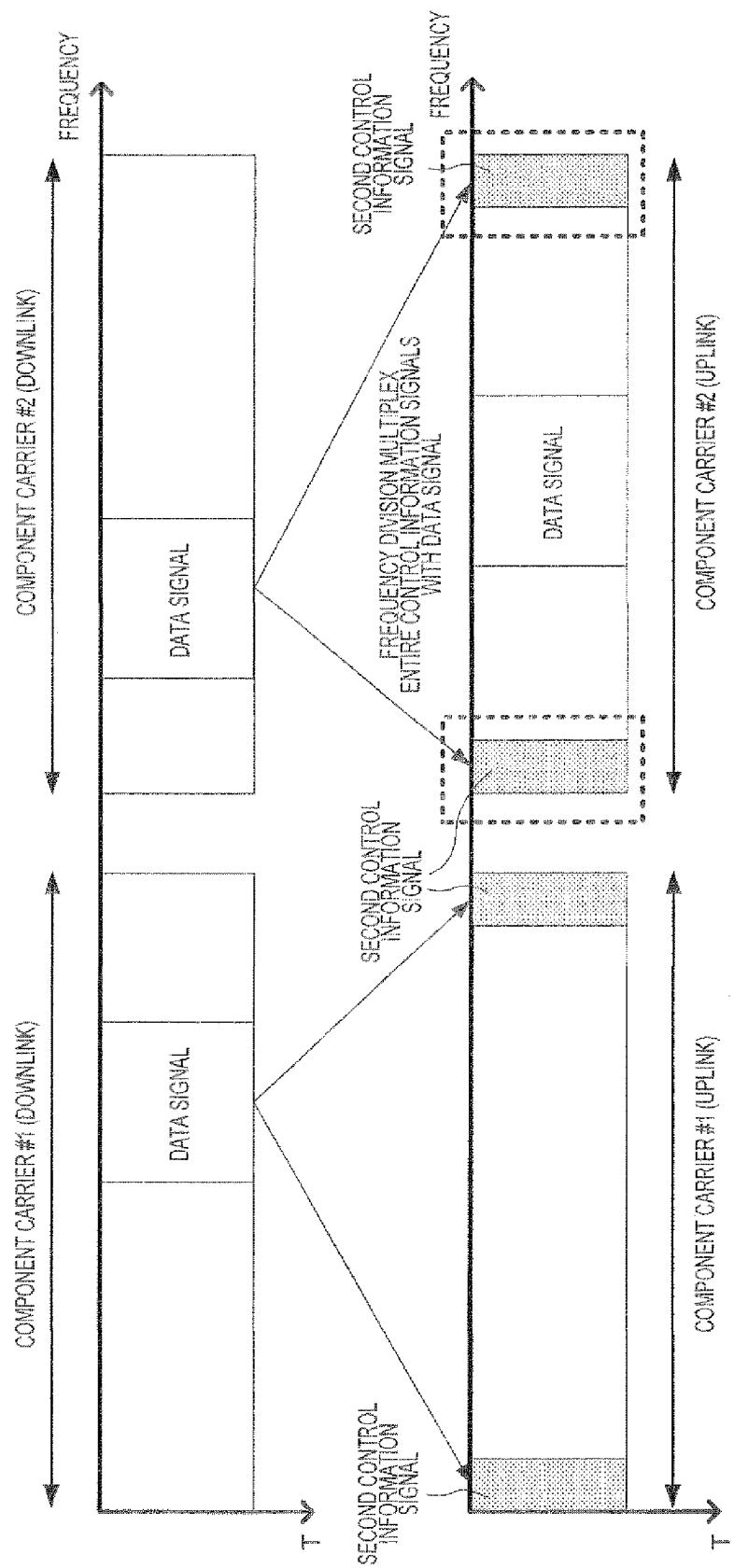
FIG. 22 is a diagram illustrating effects according to Embodiment 3.

Effects of the present embodiment will be described using FIG. 22. FIG. 22 is an example of a case where when the number of component carriers is 2, only control information signals are transmitted on component carrier #1, while both a data signal and control information signals are transmitted on component carrier #2.

Although a case has been described in Embodiment 2 where the method of multiplexing data signals and control information signals is decided/determined based on the number of component carriers used to transmit data signals, when only control information signals are transmitted as component carrier #1 in FIG. 22 in the radio communication system, the control information signals are transmitted using control information resources. As a result, even when data signals and control information signals are time division multiplexed on component carrier #2, the data signal and control information signals of component carrier #2 and the control information signals of component carrier #1 are transmitted using multicluster transmission. Therefore, even when the data signal and control information signals are time division multiplexed on component carrier #2, it is difficult to maintain low CM. Thus, when at least one of the plurality of component carriers transmits only control information signals, multiplexing method deciding section 112 and multiplexing method determining section 301a use frequency division multiplexing as the method of multiplexing control information signals and data signals on all component carriers. As shown in FIG. 22, when component carrier #1 and component carrier #2 are viewed as one unit, this corresponds to multicluster transmission, and therefore if at least one component carrier transmits only control information signals, it is possible to improve the efficiency of use of resources while suppressing the amount of increase of CM by using frequency division multiplexing as the multiplexing method.

As described above, multiplexing method deciding section 112 and multiplexing method determining section 301a decide/determine the method of multiplexing data signals and control information signals based on the presence/absence of component carriers for transmitting only control information signals of the plurality of component carriers. To be more specific, when at least one of the plurality of component carriers transmits only control information signals, multiplexing method deciding section 112 and multiplexing method determining section 301a use frequency division multiplexing as the method of multiplexing control information signals and data signals on all component carriers. This makes it possible to improve the efficiency of use of resources while suppressing the amount of increase of CM.

Although a case has been described above, where multiplexing method deciding section 112 and multiplexing method determining section 301a decide/determine the multiplexing method based on the presence/absence of a component carrier for transmitting only control information signals, the component carrier that transmits only control information signals may be counted as a component carrier that transmits data signals and frequency division multiplexing may be used as the multiplexing method when the number of component carriers is 2 or more.

Embodiment 4

The present embodiment will describe a case where the present invention is applied to MIMO (Multi Input Multi Output) communication. In MIMO communication, a plurality of streams are multiplexed to form a data signal and data signals are transmitted (multiantenna transmission) from a plurality of antennas. Multiantenna transmission has a characteristic that the greater the number of multiplexed streams forming a data signal transmitted from each antenna, the greater is CM. Thus, the present embodiment decides/determines the method of multiplexing data signals and control information signals based on the number of multiplexed streams forming a data signal transmitted from each of the plurality of antennas in the terminal that performs multiantenna transmission.

Since the principle components of the base station according to the present embodiment are the same as in Embodiment 1, descriptions thereof will be omitted. The present embodiment differs from Embodiment 1 in the method of deciding the multiplexing method in multiplexing method deciding section 112. The method of deciding the multiplexing method in multiplexing method deciding section 112 of the present embodiment will be described later.

Figure 23:
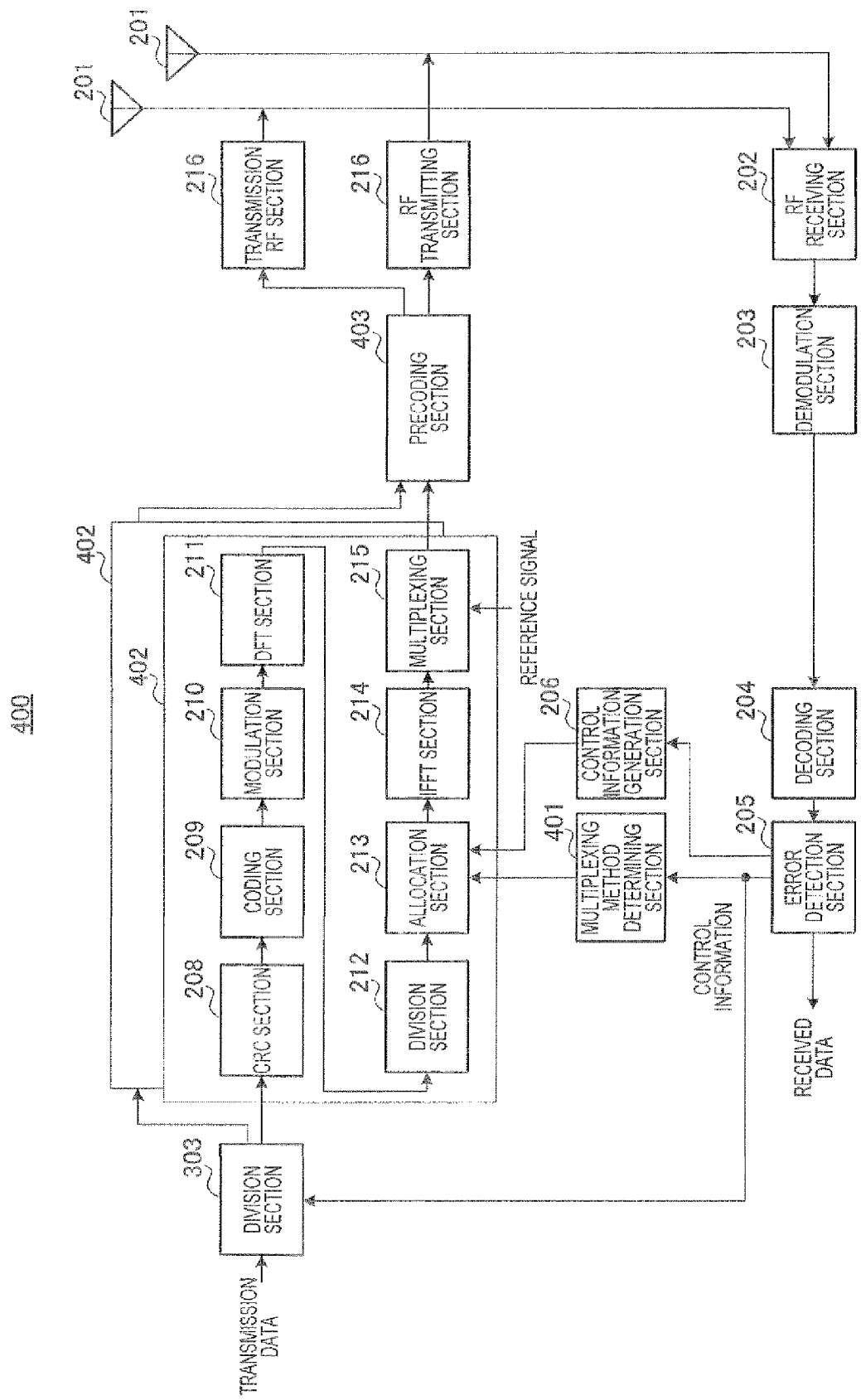
FIG. 23 is a block diagram illustrating principle components of a terminal according to Embodiment 4 of the present invention.

FIG. 23 illustrates principle components of a terminal according to the present embodiment. In terminal 400 in FIG. 23, the same components as those in FIG. 14 will be assigned the same reference numerals and descriptions thereof will be omitted. Terminal 400 in FIG. 23 is provided with multiplexing method determining section 401 instead of multiplexing method determining section 301 of terminal 300 in FIG. 14 and is provided with a plurality of antennas 201, a plurality of coding/modulation sections 402 and precoding section 403.

Precoding section 403 performs precoding on a plurality of streams outputted from the plurality of coding/modulation sections 402. To be more specific, precoding section 403 multiplexes the plurality of streams outputted from the plurality of coding/modulation sections 402 with weights assigned thereto and generates a data signal. Precoding section 403 outputs a data signal to each antenna 201.

Multiplexing method deciding section 112 and multiplexing method determining section 401 according to the present embodiment decide/determine the multiplexing method based on the number of multiplexed streams forming a data signal transmitted from each antenna 201. In this case, the number of discontinuous carrier groups to which data signals are assigned increases as the number of streams to multiplex increases.

Hereinafter, the method of deciding/determining the multiplexing method in multiplexing method deciding section 112 and multiplexing method determining section 401 will be described.

[Multiplexing Method #1]

This method divides a control information signal into a first control information signal and a second control information signal, uses time division multiplexing as the method of multiplexing the data signal and the first control information signal, uses frequency division multiplexing as the method of multiplexing the data signal and the second control information signal and increases the proportion of the second control information signal to the first control information signal as the number of multiplexed streams forming the data signal transmitted from each antenna increases.

To be more specific, (1) when the number of streams to multiplex is small, a data signal and a control information signal are entirely time division multiplexed. That is to say, 100% of a control information signal is made a first control information signal and 0% of the control information signal is made a second control information signal. When control information resources are secured in advance like PUCCH in LTE, if the data signal and control information signal are time division multiplexed without using control information resources, the efficiency of use of data resources decreases but low CM can be maintained.

(2) When the number of streams to multiplex is medium, the data signal and control information signal are multiplexed through a mixture of time division multiplexing and frequency division multiplexing. For example, X % of the control information signals is made a first control information signal and (100−X) % of the control information signal is made a second control information signal. Thus, only X % of the control information signals is time division multiplexed and (100−X) % thereof is frequency division multiplexed.

Furthermore, (3) when the number of streams to multiplex is large, a control information signal is entirely frequency division multiplexed with a data signal. That is to say, 0% of a control information signal is made a first control information signal, and 100% of the control information signal is made a second control information signal. When the number of streams to multiplex is large, CM: of the original data signal is large, and therefore even when the control information signal is frequency division multiplexed with the data signal, CM does not increase significantly and the efficiency of use of data resources can be improved by frequency division multiplexing the data signal and the control information signal.

Thus, multiplexing method determining section 401 of the terminal divides the control information signal into the first control information signal and the second control information signal, uses time division multiplexing as the method of multiplexing the data signal and the first control information signal, uses frequency division multiplexing as the method of multiplexing the data signal and the second control information signal and increases the proportion of the second control information signal to the first control information signal as the number of streams to multiplex increases.

Figure 24:
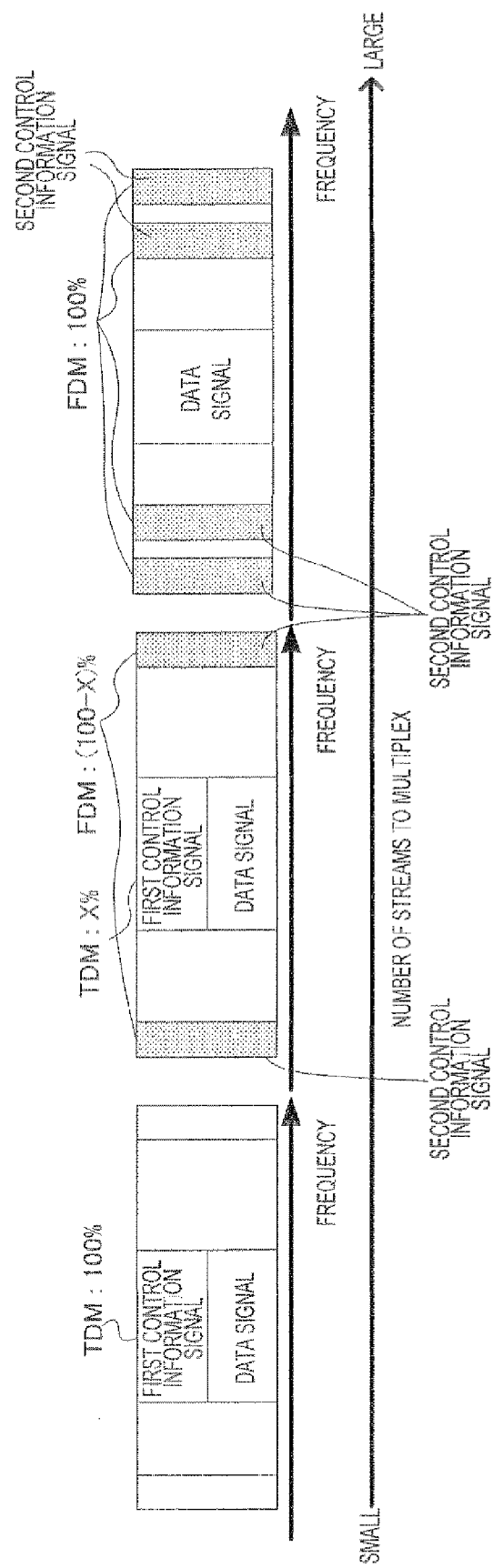
FIG. 24 is a diagram illustrating an example of resource allocation using [multiplexing method #1] according to Embodiment 4.

FIG. 24 illustrates resource allocation using [multiplexing method #1].

When the control information signal is divided into the first control information signal and the second control information signal, the first control information signal is time division multiplexed with the data signal and the second control information signal is frequency division multiplexed with the data signal, multiplexing method deciding section 112 of the base station increases the proportion of the second control information signal to the first control information signal as the number of streams to multiplex increases as with multiplexing method determining section 401.

[Multiplexing Method #2]

This method provides a threshold for the number of streams to multiplex and determines the multiplexing method based on a threshold decision result of the number of clusters against threshold Th21. To be more specific, 100% of a control information signal is time division multiplexed with a data signal when the number of streams to multiplex is less than Th21 and 100% of the control information signal is frequency division multiplexed with the data signal when the number of streams to multiplex is equal to or above Th21.

Figure 25:
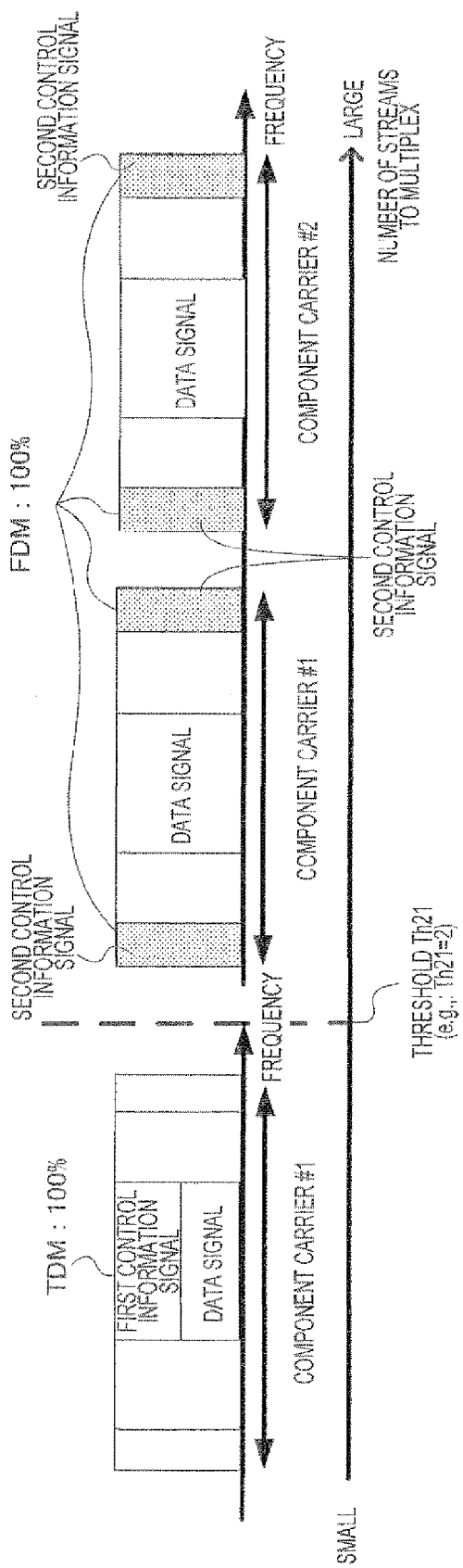
FIG. 25 is a diagram illustrating an example of resource allocation using [multiplexing method #2] according to Embodiment 4.

FIG. 25 illustrates resource allocation using [multiplexing method #2].

When the number of streams to multiplex increases, the number of discontinuous carrier groups to which data signals are assigned increases. Especially when the number of streams to multiplex increases from 1 to 2, the number of discontinuous carrier groups is always 2 or more, and it is therefore difficult to maintain low CM. Therefore, when low CM can be expected through single-carrier transmission by setting threshold Th21 to 2 and setting the number of streams to multiplex to 1, the data signal and control information signal are time division multiplexed and when the number of streams to multiplex is 2 or above and it is difficult to maintain low CM, the efficiency of use of data resources can be improved by frequency division multiplexing the data signal and control information signal.

As with multiplexing method determining section 401, multiplexing method deciding section 112 of the base station uses time division multiplexing as the multiplexing method when the number of streams to multiplex is less than threshold Th21 and uses frequency division multiplexing as the multiplexing method when the number of streams to multiplex is equal to or above threshold Th21.

[Multiplexing Method #3]

This method determines the multiplexing method based on the margin of transmission power of the terminal. Here, examples of the margin of transmission power include the difference between the maximum transmission power of the terminal and the transmission power in data transmission using the number of streams to multiplex designated by the base station.

The multiplexing method is determined based on a threshold decision result of transmission power margin against threshold Th22.

For example, time division multiplexing is used as the method of multiplexing when the margin of transmission power<Th22 and frequency division multiplexing is used as the method of multiplexing when the margin of transmission power≥Th22.

Using threshold Th22 set according to the number of streams to multiplex, a threshold decision of a communication situation (instead of the margin of transmission power) of the terminal against threshold Th22 may also be made. For example, threshold Th22 of a smaller value may be used as the number of streams to multiplex increases.

Thus, multiplexing method determining section 401 of the terminal uses time division multiplexing as the multiplexing method when the margin of transmission power is less than threshold Th22 and uses frequency division multiplexing as the multiplexing method when the margin of transmission power is equal to or above threshold Th22.

As with multiplexing method determining section 401, multiplexing method deciding section 112 of the base station uses time division multiplexing as the multiplexing method when the margin of transmission power is less than threshold Th22 and uses frequency division multiplexing as the multiplexing method when the margin of transmission power is equal to or above threshold Th22.

[Multiplexing Method #4]

The multiplexing method is determined based on a threshold decision result of the number of streams to multiplex against threshold Th21 and a threshold decision result of transmission power margin against threshold Th22.

When, for example, the number of streams to multiplex is equal to or above threshold Th21, the method of multiplexing the data signal and control information signal is decided/determined as the frequency division multiplexing. On the other hand, when the number of streams to multiplex is less than threshold Th21, multiplexing method deciding section 112 and multiplexing method determining section 401 make a threshold decision of transmission power margin against threshold Th22, decide/determine that frequency division multiplexing is the multiplexing method when the margin of transmission power is equal to or above threshold Th22 and decide/determine that time division multiplexing is the multiplexing method when the margin of transmission power is less than threshold Th22.

As described above, in the present embodiment, multiplexing method determining section 401 divides the control information signal into a first control information signal and a second control information signal, uses time division multiplexing as the method of multiplexing the data signal and the first control information signal, uses frequency division multiplexing as the method of multiplexing the data signal and the second control information signal and increases the proportion of the second control information signal to the first control information signal as the number of streams to multiplex increases. Furthermore, when the control information signal is divided into the first control information signal and the second control information signal, the first control information signal is time division multiplexed with the data signal and the second control information signal is frequency division multiplexed with the data signal, multiplexing method deciding section 112 increases the proportion of the second control information signal to the first control information signal as the number of streams to multiplex increases as with multiplexing method determining section 401.

Furthermore, multiplexing method deciding section 112 and multiplexing method determining section 401 time division multiplex 100% of a control information signal with a data signal when the number of streams to multiplex is less than Th21 and frequency division multiplex 100% of a control information signal with a data signal when the number of streams to multiplex is equal to or above Th21. Thus, the data signal and control information signal are time division multiplexed when the number of streams to multiplex is 1 and low CM can be expected through single-carrier transmission, and the data signal and control information signal are frequency division multiplexed when the number of streams to multiplex is equal to or above 2 and it is difficult to maintain low CM, and it is thereby possible to improve the efficiency of use of data resources.

Multiplexing method deciding section 112 and multiplexing method determining section 401 decide/determine the multiplexing method based on a threshold decision result of transmission power margin against threshold Th22. When, for example, threshold Th22 of a smaller value is used as the number of streams to multiplex increases, it is possible to prevent the efficiency of use of resources from deteriorating using frequency division multiplexing for a terminal having a smaller influence of the amount of increase of CM through frequency division multiplexing and flexibly set the multiplexing method according to the communication situation of the terminal.

Furthermore, multiplexing method deciding section 112 and multiplexing method determining section 401 determines the multiplexing method based on a threshold decision result of the number of streams to multiplex against threshold Th21 and a threshold decision result of transmission power margin against threshold Th22. When, for example, the number of streams to multiplex is equal to or above threshold Th21, multiplexing method deciding section 112 and multiplexing method determining section 401 use frequency division multiplexing as the multiplexing method. On the other hand, when the number of streams to multiplex is less than threshold Th21 and the margin of transmission power is equal to or above threshold Th22, multiplexing method deciding section 112 and multiplexing method determining section 401 use frequency division multiplexing as the multiplexing method. Furthermore, when the number of streams to multiplex is less than threshold Th21 and the margin of transmission power is less than threshold Th22, multiplexing method deciding section 112 and multiplexing method determining section 401 use time division multiplexing as the multiplexing method.

Although multicluster transmission has been described as an example so far, the present invention is not limited to this, but the present invention may be applied to multicarrier transmission such as N×SC-FDMA Chunk Specific DFT transmission, Clustered SC-FDMA or OFDMA. For example, OFDM transmission has a characteristic that although the number of clusters increases, CM changes little. Thus, since CM significantly changes when single-carrier transmission is changed to OFDM transmission, effects similar to those of multicluster transmission can be obtained by applying the present invention.

Although a case has been described above where control information signals include response signals such as ACK/NACK signals as an example, control information signals are not limited to response signals such as ACK/NACK signals as long as such control information signals have a feature of being required to have higher reliability than data signals. For example, control information signals may be replaced by feedback information such as CQI.

Furthermore, the control information resources on the uplink may be assigned in correspondence with downlink CCE. Moreover, the present invention is not limited to uplinks but may be applied to downlinks.

Furthermore, when a plurality of control information signals exist, frequency division multiplexing may be adopted with higher priority as the number of bits increases. For example, when ACK/NACK signals and CQI exist as control information signals, frequency division multiplexing may be applied to CQI having more bits with higher priority.

A case has been described above where a threshold is set for the margin of transmission power to make a threshold decision, but a threshold decision may also be made by providing a threshold for other control information signals whereby it is possible to decide whether or not there is a margin of transmission power of the terminal. For example, since necessary transmission power increases as propagation loss increases and the difference from maximum transmission power decreases (the margin of transmission power decreases), a threshold decision of propagation loss against a threshold may also be made. Furthermore, propagation loss tends to increase as the position of the terminal becomes farther from the base station and the margin of transmission power decreases, and therefore a threshold decision of the position of the terminal against a threshold may also be made.

Furthermore, PHR (Power Headroom) may be used as the margin of transmission power and the multiplexing method may be determined based on a threshold decision result of PHR against a threshold. Here, PHR is a reserve capacity (power that can be increased) of transmission power of the terminal and is generally information transmitted from the terminal to the base station. Both the terminal and base station share PHR. Furthermore, channel quality of the terminal such as CQI (Channel Quality Indicator) may be used as the margin of transmission power and a threshold may be provided for CQI to make a threshold decision. The better the channel quality, the greater the margin of transmission power. Moreover, a difference between the maximum transmission power of the terminal and transmission power during single-carrier transmission or the like may be used as the margin of transmission power.

Moreover, the base station may freely select a multiplexing method and report the multiplexing method to the terminal instead of providing a threshold for the margin of transmission power.

Furthermore, the terminal may decide/determine the multiplexing method according to the transmission method of the terminal reported from the base station. When, for example, the number of component carriers is equal to or above 2, frequency division multiplexing may be used as the multiplexing method and when the number of component carriers is 1, the multiplexing method may be decided/determined depending on which of single-carrier transmission or multi-carrier transmission is the case. To be more specific, when the number of components is 1 and when single-carrier transmission is used, time division multiplexing is used as the multiplexing method and when the number of components is 1 and when multicluster transmission is used, frequency division multiplexing is used as the multiplexing method.

The present embodiment assumes transmission of data signals using single-carrier transmission and focuses attention on the fact that characteristics of single-carrier transmission of data signals fall into disorder in such a case as MIMO transmission where a plurality of streams of a data signal are combined at each transmitting antenna. That is to say, when the number of streams of a data signal is 1, the data signal has a single carrier characteristic and frequency division multiplexing the data signal with control information signals causes the single carrier characteristic to fall into disorder and CM therefore increases significantly. On the other hand, when the number of streams of a data signal is plural, the single carrier characteristic is already not held and even when a data signal is frequency division multiplexed with a control information signal, the increase of CM is little. Thus, when the number of streams of a data signal is 1 (small), either time division multiplexing or frequency division multiplexing is selected taking into account the increase of CM, whereas when the number of streams of a data signal is plural (large), the increase of CM is little and therefore frequency division multiplexing is always selected.

However, there is MIMO transmission whereby each antenna can maintain single-carrier transmission. An example thereof is a method of transmitting a data signal from each antenna using single-carrier transmission and spatially multiplexing the signals in a propagation path. In this case, since the number of streams of a data signal is plural, frequency division multiplexing the data signal with control information signals results in a drastic increase of CM. However, even when MIMO transmission capable of maintaining single-carrier transmission is used, if the number of streams of a data signal is small as described in the present embodiment, there is another effect of being able to improve receiving quality of a control information signal by selecting a multiplexing method from time division multiplexing or frequency division multiplexing and always selecting frequency division multiplexing as the multiplexing method when the number of streams of a data signal is large. Hereinafter, a supplementary explanation will be given about the aspect that receiving quality of a control information signal can be improved.

A control information signal is important information and receiving quality thereof should be improved more than a data signal. When the method of multiplexing data signals and control information signals is time division multiplexing, interference between streams with the control information signals increases as the number of streams of the data signal increases and the receiving quality of the control information signals deteriorates. On the other hand, when the method of multiplexing data signals and control information signals is frequency division multiplexing, since the control information signals are allocated to resources resistant to interference between streams provided in advance, receiving quality is less likely to deteriorate due to an increase in the number of streams. Thus, even when MIMO transmission that can maintain single-carrier transmission is used, it is possible to improve receiving quality of the control information signals by frequency division multiplexing the data signals and control information signals as the number of streams of the data signals increases.

Embodiment 5

Non-patent literature 2 describes that studies are underway to semistatically report information about the method of multiplexing (time division multiplexing or frequency division multiplexing) data signals and control information signals from a base station to a terminal through higher layer signaling. Here, "semistatic reporting" refers to information reported at longer time intervals than control information (e.g. report using PDCCH: Physical Downlink Control Channel) to report per resource allocation scheduling of each terminal. Furthermore, control information (e.g. report using PDCCH) to report per resource allocation scheduling of each terminal uses dynamic reporting.

However, the above described switching method through higher layer signaling takes no account of any data signal transmission method. When a data signal is allocated to a continuous band, the CM value significantly varies depending on the method of multiplexing data signals and control information signals, and it is therefore necessary to switch the method of multiplexing data signals and control information signals (time division multiplexing or frequency division multiplexing) according to the situation of each terminal (transmission power margin, for example). On the other hand, when a data signal is allocated to a discontinuous band, the difference between CM in frequency division multiplexing and CM in time division multiplexing is small, and CM is not significantly changed by the time division multiplexing method. Therefore, when a data signal is allocated to a discontinuous band, it is preferable to improve the efficiency of use of data resources by frequency division multiplexing data signals with control information signals without considering increases in the CM value.

Here, suppose the margin of transmission power is the difference between the maximum transmission power of the terminal and transmission power used when transmitting data signals and control information signals. This transmission power margin depends on receiving quality or propagation loss or the like. For example, for a terminal far from a base station, propagation loss is large and receiving quality is poor, and therefore the transmission power used to transmit data signals and control information signals needs to be increased. In this case, the difference between transmission power and maximum transmission power of the terminal becomes smaller and the margin of transmission power becomes smaller. Thus, the margin of transmission power depends on receiving quality or propagation loss or the like and can therefore be calculated from receiving quality or propagation loss or the like.

Thus, when the method of multiplexing data signals and control information signals is semistatically reported, the present embodiment multiplexes data signals and control information signals according to the semistatically reported multiplexing method when data signals are allocated to a continuous band, and always frequency division multiplexes data signals and control information signals regardless of the semistatic report when data signals are allocated to a discontinuous band.

Hereinafter, a case will be described where continuous band allocation is used when the number of clusters is small and discontinuous band allocation is used when the number of clusters is large.

Since the principle components of the base station according to the present embodiment are the same as in Embodiment 1, descriptions thereof will be omitted. The present embodiment differs from Embodiment 1 in the scheduling method by scheduling section 111 and the method of deciding the multiplexing method in multiplexing method deciding section 112.

Scheduling section 111 selects a method of multiplexing data signals and control information signals of each terminal based on receiving quality and an estimate value inputted from estimation section 110 and schedules resources of each terminal. Scheduling section 111 then outputs dynamically reported scheduling information about the uplink and downlink (information about the transmission method of data signals and control information signals) and control information signals including information about the semistatically reported multiplexing method to CRC section 101.

To be more specific, the method of multiplexing data signals and control information signals is semistatically set based on an estimate value of receiving quality (propagation loss, for example) inputted from estimation section 110. For example, time division multiplexing is set as the multiplexing method of a terminal of poor receiving quality and frequency division multiplexing is set as the multiplexing method of a terminal of good receiving quality. Furthermore, resources of data signals of each terminal are scheduled based on an estimate value of receiving quality (propagation loss, for example) inputted from estimation section 110. In this case, scheduling is performed according to the semistatically set multiplexing method when data signals use continuous band allocation and by multiplexing data signals and control information signals always using frequency division multiplexing when data signals use discontinuous band allocation. The information about the multiplexing method set here and scheduling information are outputted to CRC section 101 and multiplexing method deciding section 112 as control information. The information about the multiplexing method is reported semistatically and scheduling information is reported dynamically to the terminal as control information.

Multiplexing method deciding section 112 decides the method of multiplexing data signals and control information signals based on information about the method of multiplexing data signals and control information signals inputted from scheduling section 111 (time division multiplexing or frequency division multiplexing) and the data signal transmission method, and decides mapping positions of the data signals and control information signals.

When data signals are allocated to a continuous band, the multiplexing method used for the received signal is decided according to the multiplexing method semistatically set by scheduling section 111 (semistatically reported method of multiplexing data signals and control information signals).

On the other hand, when data signals are allocated to a discontinuous band, multiplexing method deciding section 112 uniquely decides on frequency division multiplexing as the multiplexing method used for the received signal regardless of the method of multiplexing data signals and control information signals semistatically set by scheduling section 111.

Multiplexing method deciding section 112 outputs the information about the multiplexing method decided in this way to demapping section 114.

Since the principle components of the terminal according to the present embodiment are the same as in Embodiment 1, descriptions thereof will be omitted. The present embodiment differs from Embodiment 1 in the method of deciding the multiplexing method in multiplexing method determining section 207.

Multiplexing method determining section 207 determines the method of multiplexing data signals and control information signals based on information about the method of multiplexing data signals and control information signals included in control information inputted from error detection section 205 (semistatic report of multiplexing method) and the data signal transmission method (scheduling information or the like).

To be more specific, when data signals are allocated to a continuous band, multiplexing method determining section 207 determines the multiplexing method according to the semistatically reported method of multiplexing data signals and control information signals. That is to say, when data signals are allocated to a continuous band, multiplexing method determining section 207 determines the multiplexing method semistatically reported from base station 100 as the multiplexing method actually used.

On the other hand, when data signals are allocated to a discontinuous band, multiplexing method determining section 207 uniquely determines on frequency division multiplexing as the multiplexing method used to transmit data signals and control information signals regardless of the semistatically reported method of multiplexing data signals and control information signals.

When data signals are allocated to a discontinuous band, the amount of increase of CM is small even when data signals and control information signals are frequency division multiplexed. Therefore, when data signals are allocated to a discontinuous band, multiplexing method determining section 207 uniquely determines on frequency division multiplexing as the multiplexing method regardless of the semistatically reported method of multiplexing data signals and control information signals, and therefore can improve the efficiency of use of data signal resources while reducing the amount of increase of CM.

Multiplexing method determining section 207 outputs the information about the multiplexing method determined in this way to allocation section 213.

FIG. 26 shows an example of resource allocation according to the present embodiment. FIG. 26 shows a relationship between a semistatically set and reported method of multiplexing data signals and control information signals, a data signal transmission method and a method of multiplexing data signals and control information signals actually used for transmission signals.

As described above, multiplexing method deciding section 112 and multiplexing method determining section 207 of the present embodiment decide/determine the method of multiplexing data signals and control information signals based on the semistatically set and reported method of multiplexing data signals and control information signals and the data signal transmission method. That is to say, when data signals are allocated to a continuous band, multiplexing method deciding section 112 and multiplexing method determining section 207 set the multiplexing method according to the method of multiplexing data signals and control information signals semistatically set and reported by base station 100. On the other hand, when data signals are allocated to a discontinuous band, multiplexing method deciding section 112 and multiplexing method determining section 207 always uniquely set frequency division multiplexing as the method of multiplexing data signals and control information signals. When data signals are allocated to a discontinuous band, it is possible to improve the efficiency of use of data signal resources.

Embodiment 6

According to Non-Patent literature 2, studies are underway about the method of semistatically reporting information about the method of multiplexing data signals and control information signals (time division multiplexing or frequency division multiplexing) from the base station to the terminal through higher layer signaling.

By contrast, a transmission bandwidth assigned to each terminal (hereinafter abbreviated as "transmission bandwidth") is dynamically assigned according to the situation of the terminal. Thus, information about the transmission bandwidth is dynamically reported from the base station to the terminal. Therefore, when the method of multiplexing data signals and control information signals is semistatically reported through higher layer signaling, the timing of switching between multiplexing methods is different from the tinting of switching between transmission bandwidths, and therefore resources of control information signals may be wasted, for example, consuming resources of data signals for control information signals although resources of control information signals allocated in advance can be used.

Figure 27:
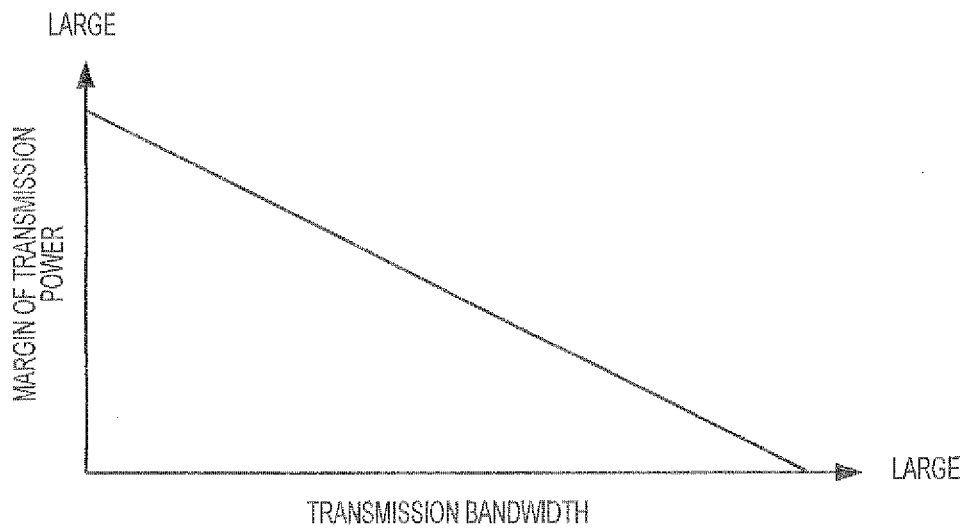
FIG. 27 is a diagram illustrating a relationship between a transmission bandwidth and transmission power margin.

To be more specific, there is such a causal relationship between a transmission bandwidth assigned to each terminal and the margin of transmission power as shown in FIG. 27. In FIG. 27, the horizontal axis shows a transmission bandwidth and the vertical axis shows the margin of transmission power of the terminal. According to LTE-Advanced, the transmission bandwidth is dynamically changed according to the situation of each terminal (amount of data transmission and receiving quality or the like).

As shown in FIG. 27, the smaller the transmission bandwidth, the greater the margin of transmission power, and the greater the transmission bandwidth, the smaller the margin of transmission power, and the margin of transmission power thereby depends on the transmission bandwidth of each terminal.

Although there is such a causal relationship between the margin of transmission power and the transmission bandwidth, the transmission bandwidth is dynamically reported and the multiplexing method is semistatically reported. In this case, the timing of switching between multiplexing methods may be different from the timing of switching between transmission bandwidths and the following waste may be produced in resources of control information signals.

Figure 28:
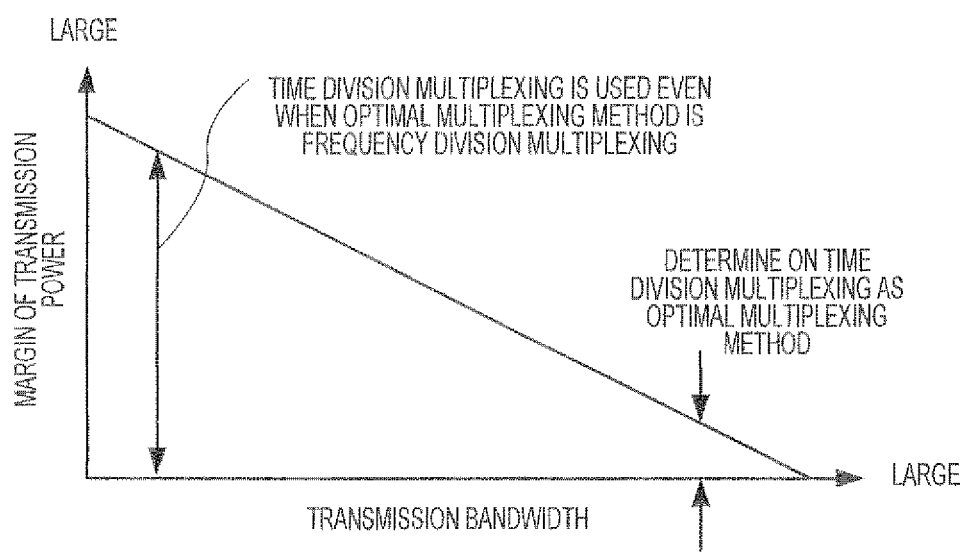
FIG. 28 is a diagram illustrating a relationship between a transmission bandwidth and transmission power margin.

For example, in a propagation path where certain loss (propagation loss) exists, when the base station determines on time division multiplexing as the method of multiplexing data signals and control information signals with reference to a certain transmission bandwidth, time division multiplexing is optimal for a reference transmission bandwidth, while frequency division multiplexing may be optimal for a transmission bandwidth smaller than the reference transmission bandwidth (see FIG. 28). Therefore, although frequency division multiplexing is optimal for a transmission bandwidth smaller than the reference transmission bandwidth, time division multiplexing is used, which causes resources of data signals to be consumed for control information signals, thus producing waste in resources of control information signals.

Thus, focusing attention on the fact that the margin of transmission power depends on the transmission bandwidth, the present embodiment switches between multiplexing methods based on transmission bandwidths related to the margin of transmission power.

Figure 29:
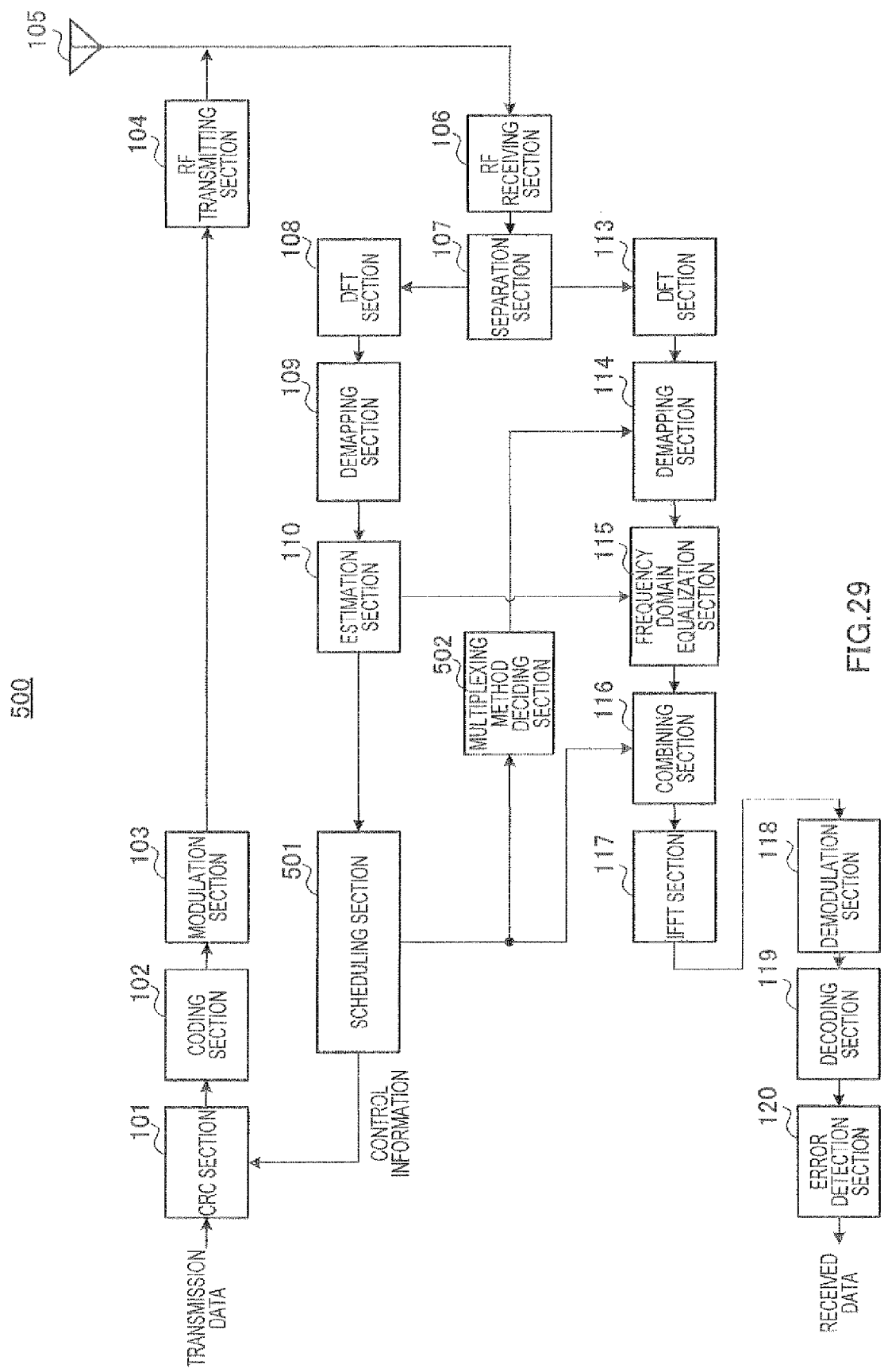
FIG. 29 is a block diagram illustrating principle components of a base station according to Embodiment 6 of the present invention.

FIG. 29 shows principle components of the base station according to the present embodiment. In base station 500 in FIG. 29, the same components as those in FIG. 5 will be assigned the same reference numerals and descriptions thereof will be omitted. Base station 500 in FIG. 29 is provided with scheduling section 501 and multiplexing method deciding section 502 instead of scheduling section 111 and multiplexing method deciding section 112 of base station 100 in FIG. 5.

Scheduling section 501 calculates the margin of transmission power from information (or from propagation loss, for example) related to receiving quality inputted from estimation section 110 and selects a certain threshold as threshold Th31 from among a plurality of candidates based on the margin of transmission power obtained. This threshold Th31 is semistatically changed.

To be more specific, a plurality of candidates shared between the base station and the terminal station are provided as a threshold for transmission bandwidths (or the number of RBs (Resource Blocks)) for switching the method of multiplexing data signals and control information signals, a certain threshold is selected from among those thresholds and the selected threshold is set as threshold Th31. Threshold Th31 is used by multiplexing method deciding section 502 which will be described later to switch the method of multiplexing data signals and control information signals. As will be described later, multiplexing method deciding section 502 decides on time division multiplexing as the multiplexing method when the transmission bandwidth is equal to or above threshold Th31 and decides on frequency division multiplexing as the multiplexing method when the transmission bandwidth is less than threshold Th31.

As described above, as the margin of transmission power of the terminal increases, even when CM is increased using frequency division multiplexing, influences of the amount of increase of CM is smaller. Thus, as the margin of transmission power increases, scheduling section 501 selects, as threshold Th31, a greater value from among the plurality of candidates for threshold Th31 and thereby increases the possibility of selecting frequency division multiplexing.

On the other hand, since the smaller the margin of transmission power of the terminal, the greater is the influence of the amount of increase of CM, scheduling section 501 selects a smaller value as threshold Th31 from among the plurality of candidates for threshold Th31 as the margin of transmission power decreases and thereby increases the possibility that time division multiplexing may be selected.

Scheduling section 501 may select threshold Th31 from among the plurality of candidates according to receiving quality, propagation loss and a position relationship between the base station and terminal instead of the margin of transmission power. To be more specific, scheduling section 501 may select a greater value as threshold Th31 from among the plurality of candidates for higher receiving quality, smaller propagation loss or a closer location.

Furthermore, scheduling section 501 performs scheduling of allocating a transmission band of each terminal using information related to receiving quality inputted from estimation section 110. In this case, scheduling section 501 schedules resources of data signals and control information signals by time division multiplexing data signals and control information signals when the transmission bandwidth of the data signals is equal to or above threshold Th31 and frequency division multiplexing data signals and control information signals when the transmission bandwidth of the data signals is less than threshold Th31.

Scheduling section 501 then outputs semistatically reported information about selected threshold Th31 and dynamically reported information about the transmission band including information about the number of clusters (e.g. uplink scheduling information) to CRC section 101 and multiplexing method deciding section 502 as control information. The information about threshold Th31 and information related to the transmission band (scheduling information) are reported to the terminal as control information.

The plurality of candidates for switching between multiplexing methods may be a limited value such as only even-numbered RBs or odd-numbered RBs. This can reduce the amount of signaling which base station 500 has to report.

Figure 30:
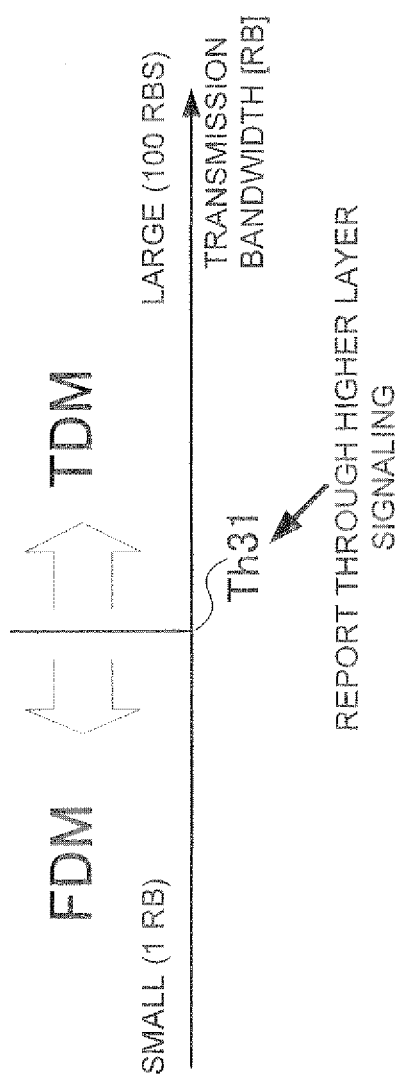
FIG. 30 is a diagram illustrating an example of resource allocation according to Embodiment 6.

Multiplexing method deciding section 502 receives as input threshold Th31 selected by scheduling section 501 and information about the transmission band, decides on frequency division multiplexing as the multiplexing method when the transmission bandwidth is less than Th31, decides on time division multiplexing as the multiplexing method when the transmission bandwidth is equal to or above Th31 and determines mapped resources of data signals and control information signals. FIG. 30 illustrates the correspondence between the transmission bandwidth, threshold Th31 and the multiplexing method.

Multiplexing method deciding section 502 outputs information about mapped resources of the decided data signals and control information signals to demapping section 114.

Figure 31:
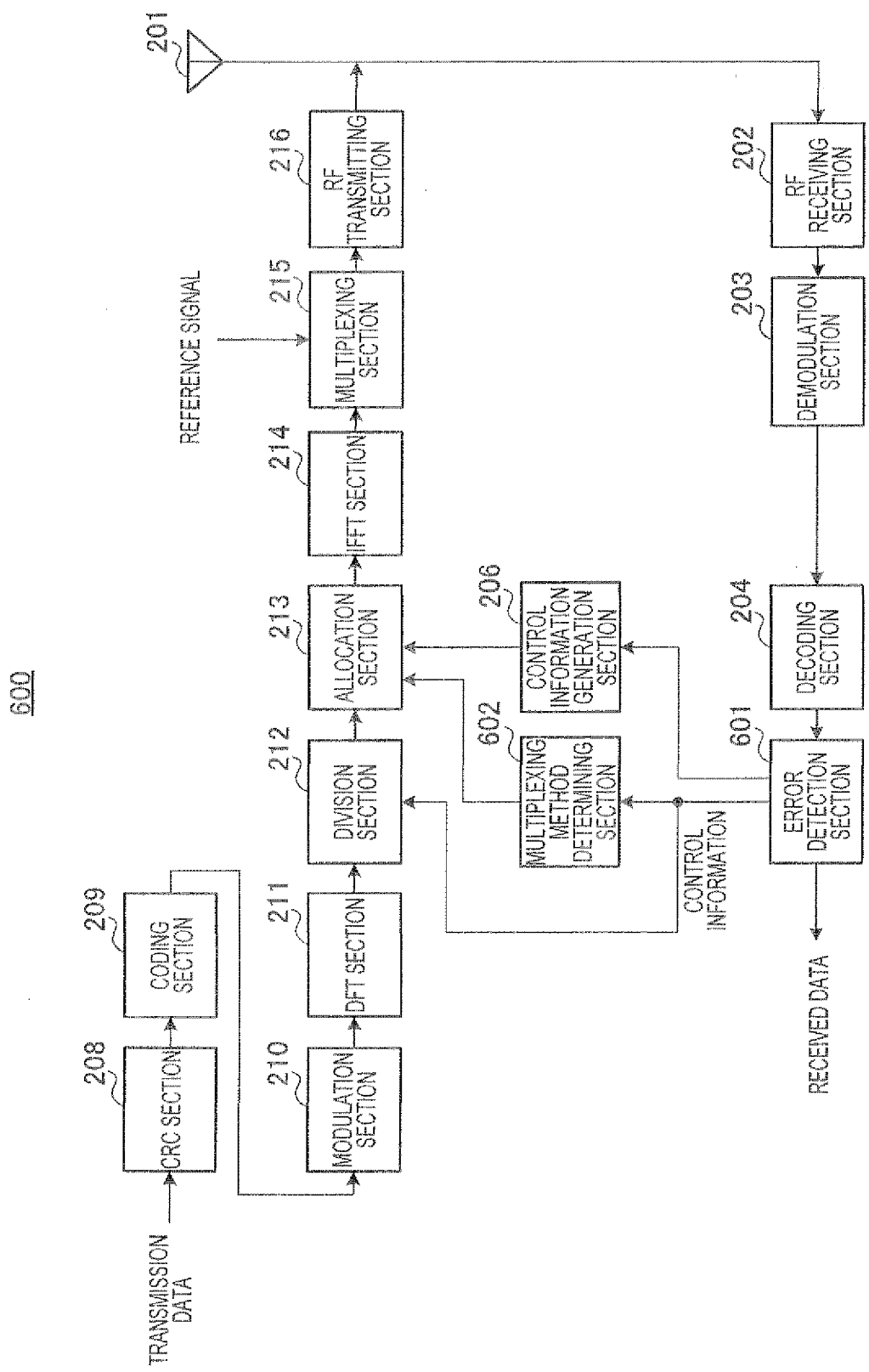
FIG. 31 is a block diagram illustrating principle components of a terminal according to Embodiment 6.

FIG. 31 illustrates principle components of a terminal according to the present embodiment. In terminal 600 in FIG. 31, the same components as those in FIG. 6 will be assigned the same reference numerals and detailed descriptions thereof will be omitted. Terminal 600 in FIG. 31 is provided with error detection section 601 and multiplexing method determining section 602 instead of error detection section 205 and multiplexing method determining section 207 of terminal 200 in FIG. 6.

Error detection section 601 performs error detection on decoded data. For example, CRC check is used for error detection. Error detection section 601 decides the presence/absence of a decoding error as a result of the error detection and outputs the decision result to control information generation section 206. Furthermore, when there is no decoding error, error detection section 601 extracts threshold Th31 and information about the transmission method of data signals from the decoded data and outputs the extracted information to multiplexing method determining section 602 and division section 212 and outputs decoded data corresponding to the data signals as received data.

Multiplexing method determining section 602 decides the method of multiplexing data signals and control information signals based on threshold Th31 inputted from error detection section 601 and information about a transmission band including information about the number of clusters.

First, multiplexing method determining section 602 extracts threshold Th31 included in control information and information about the transmission band including information about the number of clusters. Here, threshold Th31 indicates a point in the transmission bandwidth to switch the method of multiplexing data signals and control information signals.

Multiplexing method determining section 602 then determines on frequency division multiplexing as the method of multiplexing data signals and control information signals when the transmission bandwidth designated in information about the transmission band is less than Th31 and determines on time division multiplexing as the method of multiplexing data signals and control information signals when the transmission bandwidth designated in information about the transmission band is equal to or above Th31.

As described above, scheduling section 501 selects a greater value as threshold Th31 of a plurality of candidates for threshold Th31 as the margin of transmission power increases and selects a smaller value as threshold Th31 of the plurality of candidates for threshold Th31 as the margin of transmission power decreases. When the margin of transmission power is large, this increases the rate at which multiplexing method determining section 602 determines on frequency division multiplexing as the multiplexing method, and therefore can prevent the efficiency of use of resources from deteriorating. On the other hand, when the margin of transmission power is small, the rate at which multiplexing method determining section 602 determines on time division multiplexing as the multiplexing method increases, and therefore can prevent receiving quality from deteriorating.

As described above, the present embodiment switches the method of multiplexing data signals and control information signals based on the relationship in size between a dynamically reported transmission bandwidth of each terminal and a semistatically reported threshold, thereby provides a plurality of candidates (thresholds) as transmission bandwidths for switching the method of multiplexing data signals and control information signals and selects one from among the candidates and semistatically reports the candidate.

Scheduling section 501 selects threshold Th31 indicating a switching point of the transmission bandwidth for switching the method of multiplexing data signals and control information signals from among a plurality of candidates based on the margin of transmission power. To be more specific, scheduling section 501 selects a greater value as threshold Th31 from among a plurality of candidates as the margin of transmission power increases. Multiplexing method deciding section 502 and multiplexing method determining section 602 then decide/determine that frequency division multiplexing is the method of multiplexing data signals and control information signals when the transmission bandwidth is less than Th31. On the other hand, when the transmission bandwidth is equal to or above Th31, multiplexing method deciding section 502 and multiplexing method determining section 602 decide/determine that time division multiplexing is the method of multiplexing data signals and control information signals.

Thus, since the influence of an increase in CM decreases as the margin of transmission power increases, scheduling section 501 can increase the rate at which data signals are time division multiplexed with control information signals as the margin of transmission power increases. On the other hand, setting threshold Th31 to a greater value as the margin of transmission power increases the rate at which frequency division multiplexing is selected as the multiplexing method, and therefore can prevent the efficiency of use of resources from deteriorating.

Furthermore, setting threshold Th31 to a smaller value as the margin of transmission power decreases can increase the rate at which time division multiplexing is selected as the method of multiplexing data signals and control information signals. In this case, use of time division multiplexing causes CM to decrease, so that a margin for increasing transmission power is provided, and, by increasing transmission power, it is possible to prevent receiving quality from deteriorating.

Thus, the present embodiment can switch between time division multiplexing and frequency division multiplexing according to the margin of transmission power (or transmission bandwidth).

In other words, when there is a margin of transmission power, adopting frequency division multiplexing can effectively use resources of data signals and when there is little margin of transmission power, adopting time division multiplexing can reduce CM.

Particularly, when the transmission bandwidth is narrow as in the case of prior arts (e.g. when the bandwidth for the terminal to transmit a data signal is 1 RB), use of time division multiplexing causes most of time resources for transmitting data signals to be replaced by time resources for transmitting control information signals, which deteriorates the efficiency of use of data signal resources.

However, in the present embodiment, when there is a margin of transmission power and the transmission bandwidth is narrow, the rate at which frequency division multiplexing is used increases. In frequency division multiplexing, since control information signals are transmitted with resources allocated in advance, only data signals can be transmitted with resources allocated to transmit data signals, enabling the efficiency of use of data signal resources to be improved.

Although the transmission bandwidth is assumed as a continuous band in the above descriptions, the total of bands allocated in a discontinuous band may be assumed as the transmission bandwidth.

Embodiment 7

A case has been described in. Embodiment 6 where multiplexing method deciding section 502 and multiplexing method determining section 602 decide/determine the multiplexing method assuming that the relationship between the transmission bandwidth of data signals and threshold Th31 is fixed regardless of the data signal transmission method. A case will be described in the present embodiment where the relationship between the transmission bandwidth of data signals and threshold Th31 differs between continuous band allocation and discontinuous band allocation of data signals.

The data signal transmission method includes continuous band allocation whereby a data signal is allocated to one cluster and discontinuous band allocation whereby a data signal is allocated to a plurality of clusters. For example, according to LTE-Advanced, transmission method can be dynamically switched for every scheduling cycle such as continuous band allocation when a data signal is allocated to only one cluster and discontinuous allocation when a data signal is allocated to a plurality of clusters. Since a switching point for an optimal multiplexing method differs between continuous band allocation and discontinuous band allocation, if a switching point of the same multiplexing method is set, an optimal multiplexing method may not be selected.

Thus, the present embodiment decides/determines a method of multiplexing data signals and control information signals using threshold Th32 [RB] in discontinuous band allocation uniquely defined from threshold Th31 in addition to threshold Th31 in continuous band allocation.

Since the principle components of the base station according to the present embodiment are the same as in Embodiment 6, descriptions thereof will be omitted. The present embodiment differs from Embodiment 6 in the method of determining the multiplexing method by scheduling section 501 and multiplexing method deciding section 502.

Multiplexing method deciding section 502 decides whether the method of multiplexing data signals and control information signals is time division multiplexing or frequency division multiplexing using threshold Th31 for switching the method of multiplexing data signals and control information signals and threshold Th32 associated with threshold Th31, and determines resources to which data signals and control information signals are mapped.

Scheduling section 501 calculates the margin of transmission power from receiving quality (propagation loss, for example) and selects a threshold for continuous band allocation as threshold Th31 from among a plurality of candidates based on the calculated margin of transmission power. Moreover, scheduling section 501 calculates and sets Th32 from above described threshold Th31 as a threshold for discontinuous band allocation.

The relationship between threshold Th31 and threshold Th32 will be described below.

[1] When Receiving Quality is Low

In a situation where receiving quality is low, when data signals are allocated to a continuous band, data signals and control information signals are preferably time division multiplexed. This causes CM to decrease and causes the margin of transmission power to increase, and therefore can improve transmission power and improve receiving quality.

To realize this, in the case of continuous band allocation, it is preferable to lower the switching point for switching the method of multiplexing data signals and control information signals, that is to say, threshold Th31 so that time division multiplexing is more likely to be selected.

On the other hand, in the case of discontinuous band allocation, if this allocation is switched to continuous band allocation when receiving quality deteriorates, continuous band allocation with a low CM value is used and the transmission power margin improves. When the transmission power margin improves, it is possible to increase transmission power for transmitting data signals and improve receiving quality. Therefore, for discontinuous band allocation, it is not necessary to make any setting so that time division multiplexing is more likely to be selected, and it is rather preferable to effectively use data signal resources by adopting frequency division multiplexing. Thus, in the case of discontinuous band allocation, this allocation only needs to be switched to continuous band allocation when receiving quality deteriorates, and it is therefore not necessary to lower the switching point between multiplexing methods.

That is to say, scheduling section 501 determines whether receiving quality is high or low based on information related to receiving quality inputted from estimation section 110. When receiving quality is low, threshold Th31 in continuous band allocation is set to a lower value compared to threshold Th32 in discontinuous band allocation. To be more specific, scheduling section 501 determines threshold Th31 according to the situation (receiving quality or amount of data transmission or the like) of the terminal and uniquely determines threshold Th32 in discontinuous band allocation based on threshold Th31 so as to satisfy Th32>Th31. These thresholds Th31 and Th32 are set as thresholds for switching the method of multiplexing data signals and control information signals. Information about whether the receiving quality is high or low (or information about the relationship between Th32 and Th31) and information about threshold Th31 are semistatically reported to the terminal station.

Figure 32:
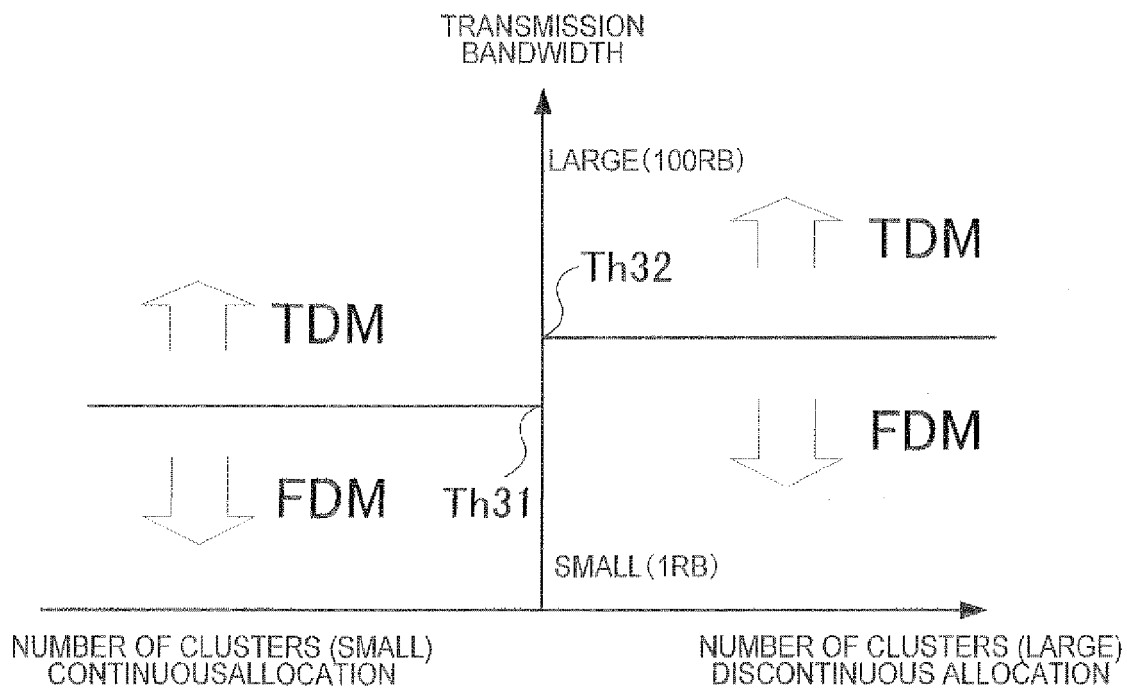
FIG. 32 is a diagram illustrating an example of resource allocation according to Embodiment 7 of the present invention.

FIG. 32 is a diagram illustrating a relationship between threshold Th31, threshold Th32 and multiplexing method in a situation where the receiving quality is low.

When the receiving quality deteriorates, switching from discontinuous band allocation to continuous band allocation enables CM to be suppressed to a low level and increases the margin of transmission power. When the margin of transmission power increases, transmission power for transmitting data signals can be increased and the receiving quality can be improved. Therefore, when the receiving quality deteriorates and there is little margin of transmission power, if the margin of transmission power is improved by switching discontinuous band allocation to continuous band allocation without assuming to improve the transmission power margin by switching frequency division multiplexing to time division multiplexing at all, there is no need to assume time division multiplexing in discontinuous band allocation. That is to say, in the case of discontinuous band allocation, this allocation only needs to be switched to continuous band allocation when the receiving quality deteriorates, and it is therefore not necessary to lower the switching point between multiplexing methods. That is to say, when there is no transmission power margin in discontinuous band allocation, threshold Th32 for switching between multiplexing methods may be set to infinite by assuming that the multiplexing method is always switched to continuous band allocation.

Figure 33:
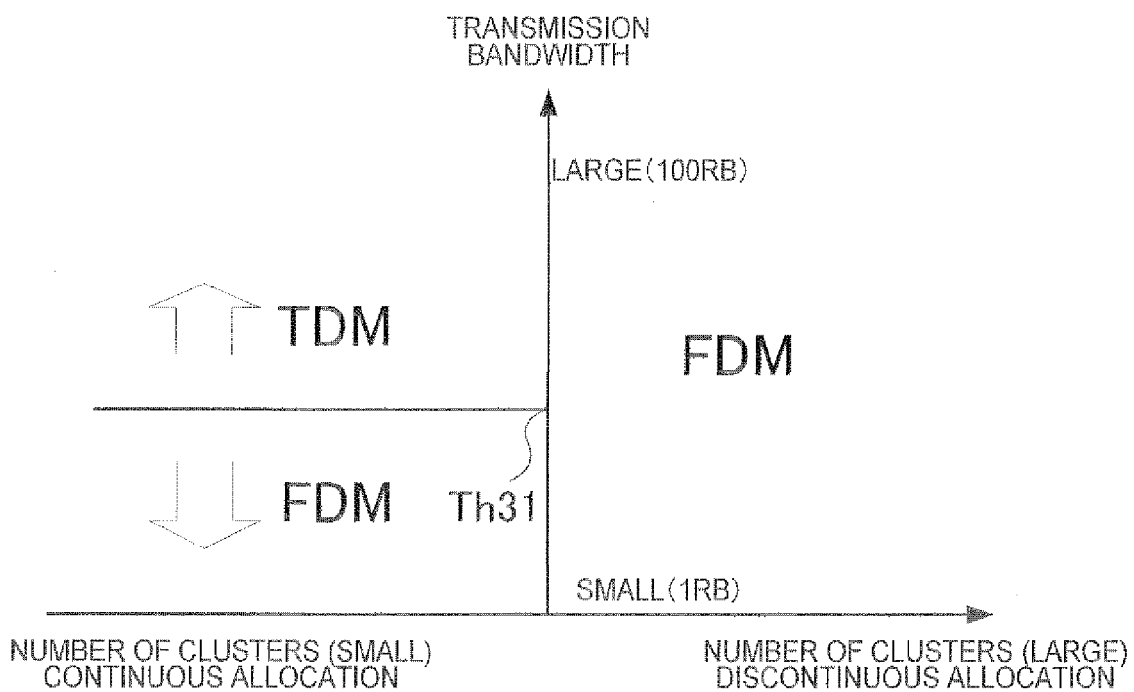
FIG. 33 is a diagram illustrating another example of resource allocation according to Embodiment 7.

That is to say, in continuous band allocation, frequency division multiplexing is selected when the transmission bandwidth is less than Th31 and time division multiplexing is selected when transmission bandwidth is Th31 or above, while in discontinuous band allocation, frequency division multiplexing is always selected. FIG. 33 illustrates a relationship between threshold Th31, threshold Th32 (infinite) and the multiplexing method in this case.

[2] When Receiving Quality is High

In a situation where receiving quality is high, prime importance is placed on throughput rather than on improvement of receiving quality, and therefore even when data signals are allocated to a continuous band, data signals and control information signals are preferably frequency division multiplexed. Frequency division multiplexing allows control information signals to be allocated to predetermined control information resources and eliminates the necessity of allocating data signal resources to control information signals, and therefore can effectively use data signal resources and improve throughput. To realize this, it is preferable to raise the point to switch the method of multiplexing data signals and control information signals, that is to say, threshold Th31 in continuous band allocation so that frequency division multiplexing is more likely to be selected.

The switching point may also be raised in the case of discontinuous band allocation as with continuous band allocation, but CM is greater in discontinuous band allocation than continuous band allocation. For this reason, for the same transmission bandwidth, the margin of transmission power is lower for discontinuous band allocation than for continuous band allocation. Thus, when data signals are allocated to a discontinuous band in a situation where receiving quality is high, threshold Th32 smaller than threshold Th31 may be used as the switching point. This causes frequency division multiplexing to be less likely to be selected in discontinuous band allocation, and therefore can suppress deterioration of CM.

That is to say, scheduling section 501 decides whether receiving quality is high or low based on information related to the receiving quality inputted from estimation section 110. When the receiving quality is high, threshold Th31 in continuous band allocation is set to a higher value than threshold Th32 in discontinuous band allocation. To be more specific, scheduling section 501 determines threshold Th31 according to the situation (receiving quality or amount of data transmission or the like) of the terminal and uniquely determines threshold Th32 in discontinuous band allocation based on threshold Th31 so as to satisfy Th32<Th31, These thresholds Th31 and Th32 are set as thresholds for switching the method of multiplexing data signals and control information signals. Information as to whether the receiving quality is high or low (or information about the relationship between Th32 and Th31) and information about threshold Th31 are semistatically reported to the terminal station.

Figure 34:
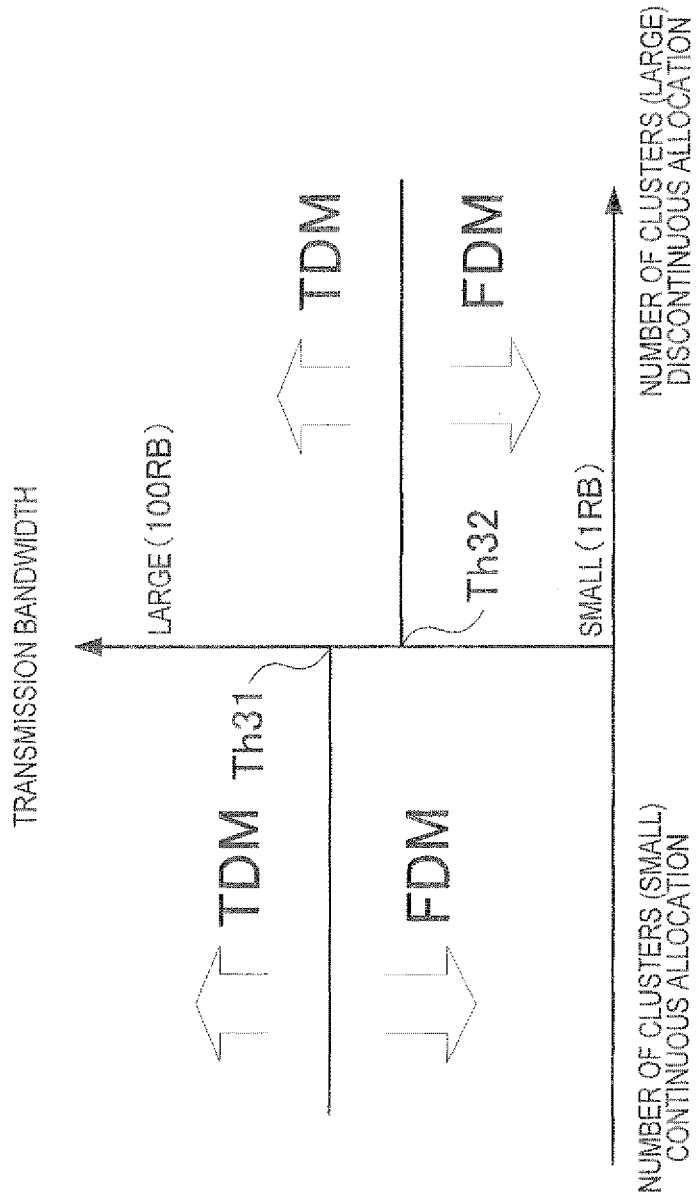
FIG. 34 is a diagram illustrating a further example of resource allocation according to Embodiment 7.

FIG. 34 is a diagram illustrating a relationship between threshold Th31, threshold Th32 and the multiplexing method in a situation where receiving quality is high.

Thus, scheduling section 501 sets threshold Th31 based on the transmission bandwidth and receiving quality and sets threshold Th32 based on threshold Th31 set and receiving quality.

Summarizing the operation of scheduling section 501, scheduling section 501 sets thresholds (Th31, Th32) for switching the method of multiplexing data signals and control information signals using information related to receiving quality inputted from estimation section 110 and schedules allocation of transmission band of each terminal. In this case, scheduling section 501 time division multiplexes data signals with control information signals when a transmission bandwidth is equal to or above threshold Th31 in continuous band allocation of data signals, frequency division multiplexes data signals with control information signals when the transmission bandwidth of data signals is less than threshold Th31 and thereby schedules data signals and control information signals. Scheduling section 501 time division multiplexes data signals with control information signals when the transmission bandwidth is equal to or above threshold Th32 in discontinuous band allocation of data signals, frequency division multiplexes data signals with control information signals when the transmission bandwidth of data signals is less than threshold Th32, and thereby schedules data signals and control information signals.

Scheduling section 501 then outputs the information about threshold Th31 set here (and information about the relationship between Th31 and Th32), information about the transmission band and transmission method (e.g. scheduling information) to CRC section 101 and outputs the information about threshold Th32 determined from threshold Th31 and threshold Th31 and the information about the transmission band and transmission method (e.g. scheduling information) to multiplexing method deciding section 502.

Furthermore, when data signals are allocated to a continuous band, multiplexing method deciding section 502 decides on frequency division multiplexing as the multiplexing method when the transmission bandwidth is less than Th31 and decides on time division multiplexing as the multiplexing method when the transmission bandwidth is equal to or above Th31. On the other hand, when data signals are allocated to a discontinuous band, multiplexing method deciding section 502 decides on frequency division multiplexing as the multiplexing method when the transmission bandwidth is less than Th32 and decides on time division multiplexing as the multiplexing method when the transmission bandwidth is equal to or above Th32, and determines resources to which data signals and control information signals are mapped.

Since principle components of the terminal according to the present embodiment are the same as in Embodiment 6, descriptions thereof will be omitted. The present embodiment is different from Embodiment 6 in the method of determining a multiplexing method by error detection section 601 and multiplexing method determining section 602.

Error detection section 601 performs error detection on decoded data. For example, CRC check is used for error detection. As a result of the error detection, error detection section 601 decides the presence/absence of a decoding error and outputs the decision result to control information generation section 206. Furthermore, when no decoding error is detected, error detection section 601 extracts threshold Th31 (and information about the relationship between Th31 and Th32) and information about the transmission band and transmission method of data signals, generates information about threshold Th31 and threshold Th32, outputs the information to multiplexing method determining section 602 and division section 212 and outputs decoded data for the data signal as received data.

Multiplexing method determining section 602 determines whether the method of multiplexing data signals and control information signals is time division multiplexing or frequency division multiplexing using information about the transmission bandwidth and transmission method inputted from error detection section 601, information about switching threshold Th3 and switching threshold Th32 uniquely determined from threshold Th31 (and information about the relationship between Th31 and Th32).

To be more specific, when data signals are allocated to a continuous band, multiplexing method determining section 602 determines on frequency division multiplexing as the multiplexing method when the transmission bandwidth is less than Th31 and determines on time division multiplexing as the multiplexing method when the transmission bandwidth is equal to or above Th31. On the other hand, when data signals are allocated to a discontinuous band, multiplexing method determining section 602 determines on frequency division multiplexing as the multiplexing method when the transmission bandwidth is less than Th32 and determines on time division multiplexing as the multiplexing method when the transmission bandwidth equal to or above Th32.

Suppose the relationship between threshold Th31 and threshold Th32 is shared between base station 500 and terminal 600.

As described above, the present embodiment sets threshold Th31 in continuous band allocation to a value lower than threshold Th32 in discontinuous band allocation in a range where receiving quality is low. This increases the rate at which time division multiplexing is used, and therefore can improve receiving quality. Furthermore, scheduling section 501 sets threshold Th32 which is the switching point in the case of discontinuous band allocation so as to satisfy Th31<Th32. This makes it possible to obtain receiving quality also in discontinuous band allocation on par with that in continuous band allocation having the same transmission bandwidth.

On the other hand, threshold Th31 in continuous band allocation is set to a value higher than threshold Th32 in discontinuous band allocation in a range where receiving quality is high. This increases the rate at which frequency division multiplexing is used, and therefore can improve the efficiency of use of data signal resources. Furthermore, scheduling section 501 sets threshold Th32 which is a switching point in the case of discontinuous band allocation so as to satisfy Th31>Th32. This causes frequency division multiplexing to be less likely to be selected in discontinuous band allocation, and therefore can suppress deterioration of CM.

Although a range where receiving quality is high and a range where receiving quality is low have been described, the present invention is not limited to this, but switching may be performed based on some element other than receiving quality or only one of a method using a range where receiving quality is high and a method using a range where receiving quality is low may be used.

Scheduling section 501 semistatically sets threshold Th31 for switching the method of multiplexing data signals and control information signals. For this reason, threshold Th31 set may cease to be an optimal threshold by the next updating due to the time variation of the propagation path. As a result, receiving quality deteriorates extremely and the same frequency division multiplexing at the time of setting may be used although time division multiplexing is appropriate, resulting in an increase in an error rate of data signals. Thus, when there is a drastic time variation in the propagation path, it is preferable to use the method described using FIG. 32 whereby time division multiplexing is more likely to be selected as the method of multiplexing data signals and control information signals assuming the case where receiving quality extremely deteriorates, and thereby attach more importance to receiving quality.

Furthermore, a case has been described above where base station 500 and terminal 600 share the relationship between threshold Th31 and threshold Th32, and base station 500 and terminal 600 uniquely set threshold Th32 from threshold Th31, but base station 500 may report threshold Th32 set to terminal 600 through signaling.

The present invention is applicable to a technique of changing a method of multiplexing data signals and control information signals depending on whether data signals are allocated to a continuous band or allocated to a discontinuous band. Furthermore, the present invention is applicable to a technique of changing a method of multiplexing data signals and control information signals according to the number of clusters of data signals.

Although a case has been described in the above embodiments where the present invention is applied to an antenna, the present invention is also applicable to an antenna port likewise.

The "antenna port" refers to a theoretical formed with one or a plurality of physical antennas. That is to say, the antenna port not necessarily refers to one physical antenna but may refer to an antenna array formed with a plurality of antennas or the like.

For example, 3GPP LTE does not define of how many physical antennas an antenna port is composed but defines it as the minimum unit through which a base station can transmit different reference signals.

Furthermore, the antenna port may be defined as the minimum unit of multiplying weights of a precoding vector.

Moreover, although cases have been described with the embodiments above where the present invention is configured by hardware, the present invention may be implemented by software.

Each function block employed in the description of the aforementioned embodiment may typically be implemented as an LSI constituted by an integrated circuit. These may be individual chips or partially or entirely contained on a single chip. "LSI" is adopted here but this may also be referred to as "IC," "system LSI," "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosures of Japanese Patent Application No. 2008-280340, filed on Oct. 30, 2008 and Japanese Patent Application No. 2009-184702, filed on Aug. 7, 2009, including the specifications, drawings and abstracts, are incorporated herein by reference in their entirety.

INDUSTRIAL APPLICABILITY

The radio communication apparatus and the radio communication method according to the present invention can improve the efficiency of use of data resources while suppressing the increases of CM of a transmission signal in a radio communication system in which single-carrier transmission and multicluster transmission are both used, and is suitable for use in, for example, an LTE-Advanced radio communication terminal and radio communication apparatus.

REFERENCE SIGNS LIST 100, 500 Base station apparatus
101, 208 CRC section
102, 209 Coding section
103, 210 Modulation section
104, 216 RF transmitting section
105, 201 Antenna
106, 202 RF receiving section
107 Separation section
108, 113, 211 DFT section
109, 114 Demapping section
110 Estimation section
111, 501 Scheduling section
112, 502 Multiplexing method deciding section
115 Frequency domain equalization section
116 Combining section
117, 214 IFFT section
118, 203 Demodulation section
119, 204 Decoding section
120, 205, 601 Error detection section
200, 300, 300a, 400, 600 Terminal apparatus
206 Control information generation section
207, 301, 301a, 401, 602 Multiplexing method determining section
212, 303, 303a Division section
213 Allocation section
215 Multiplexing section
302, 402 Coding/modulation section
304 Combining section
403 Precoding section

The invention claimed is:

1. A radio transmission apparatus adopted in a radio communication system in which a single-carrier transmission and a multicluster transmission are both used, the radio transmission apparatus comprising:
a determining section that determines a method of multiplexing a data signal and a control information signal based on a number of carrier groups used to transmit the data signal;
a multiplexing section that multiplexes the data signal and the control information signal to generate a multiplexed signal based on the determined multiplexing method; and
a transmission section that transmits the multiplexed signal to a radio reception apparatus, wherein the determining section uses a frequency division multiplexing as the multiplexing method when the number of carrier groups is equal to or more than a first threshold, uses a time division multiplexing as the multiplexing method when the number of carrier groups is less
than the first threshold and a margin of transmission power is less than a second threshold, and uses a frequency division multiplexing as the multiplexing method when the number of carrier groups is less than the first threshold and a margin of transmission power is equal to or more than the second threshold.

2. The radio transmission apparatus according to claim 1, wherein the margin of transmission power is a power headroom or a channel quality.

3. The radio transmission apparatus according to claim 2, wherein the second threshold decreases when the number of carrier groups increases.

4. The radio transmission apparatus according to claim 1, wherein the number of carrier groups is a number of clusters in the multicluster transmission.

5. The radio transmission apparatus according to claim 1, wherein the number of carrier groups is a number of component carriers in the radio communication system.

6. A radio reception apparatus adopted in a radio communication system in which a single-carrier transmission and a multicluster transmission are both used, the radio reception apparatus comprising:
a decision section that decides a method of multiplexing a data signal and a control information signal based on a number of carrier groups, the number of carrier groups to which the data signal transmitted from the radio transmission apparatus is allocated; and
a demapping section that extracts the data signal and the control information signal based on the decided multiplexing method, wherein the decision section uses a frequency division multiplexing as the multiplexing method when the number of carrier groups is equal to or more than a first threshold, uses a time division multiplexing as the multiplexing method when the number of carrier groups is less
than the first threshold and a margin of transmission power is less than a second threshold, and uses a frequency division multiplexing as the multiplexing method when the number of carrier groups is less than the first threshold and a margin of transmission power is equal to or more than the second threshold.

7. The radio reception apparatus according to claim 6, wherein the decision section uses a time division multiplexing as the multiplexing method when the number of carrier groups is less than a first threshold, uses a time division multiplexing as the multiplexing method when the number of carrier groups is less than the first threshold and a margin of transmission power is less than a second threshold, and uses frequency division multiplexing as the multiplexing method when the number of carrier groups is less than the first threshold and a margin of transmission power is equal to or more than the second threshold.

8. The radio reception apparatus according to claim 7, wherein the margin of transmission power is a power headroom or a channel quality.

9. A radio communication method to be adopted in a radio communication system in which a single-carrier transmission and a multicluster transmission are both used, the radio communication method comprising:

determining a method of multiplexing a data signal and a control information signal based on a number of carrier groups used to transmit the data signal;

generating a multiplexed signal by multiplexing the data signal and the control information signal based on the determined multiplexing method; and transmitting the multiplexed signal to a radio reception apparatus, wherein the radio communication system uses a frequency division multiplexing as the multiplexing method when the number of carrier groups is equal to or more than a first threshold, uses a time division multiplexing as the multiplexing method when the number of carrier groups is less than the first threshold and a margin of transmission power is less than a second threshold, and uses a frequency division multiplexing as the multiplexing method when the number of carrier groups is less than the first threshold and a margin of transmission power is equal to or more than the second threshold.

10. A radio communication method to be adopted in a radio communication system in which a single-carrier transmission and a multicluster transmission are both used, the radio communication method comprising:

deciding a method of multiplexing a data signal and a control information signal based on a number of carrier groups, the number of carrier groups to which the data signal transmitted from the radio transmission apparatus is allocated; and extracting the data signal and the control information signal based on the decided multiplexing method, wherein the radio communication system uses a frequency division multiplexing as the multiplexing method when the number of carrier groups is equal to or more than a first threshold, uses a time division multiplexing as the multiplexing method when the number of carrier groups is less than the first threshold and a margin of transmission power is less than a second threshold, and uses a frequency division multiplexing as the multiplexing method when the number of carrier groups is less than the first threshold and a margin of transmission power is equal to or more than the second threshold.

* * * * *